United States Patent [19]
Fritz et al.

[11] 3,903,771
[45] Sept. 9, 1975

[54] APPARATUS FOR EDGING AND RESAWING LUMBER

[75] Inventors: Rene Fritz; Rene Eugene Fritz, both of Albany, Oreg.

[73] Assignee: Albany International Industries, Inc., Albany, Oreg.

[22] Filed: Jan. 21, 1972

[21] Appl. No.: 219,642

Related U.S. Application Data

[62] Division of Ser. No. 885,389, Dec. 15, 1969.

[52] U.S. Cl. ................. 83/102.1; 83/112; 83/155; 83/425.2; 83/158; 83/368; 144/312
[51] Int. Cl.... B27b 15/04; B27b 31/08; B27b 31/06
[58] Field of Search .......... 83/102.1, 425, 522, 365, 83/368, 105, 112, 155, 155.1, 425.2, 158; 144/312

[56] References Cited
UNITED STATES PATENTS

| | | | |
|---|---|---|---|
| 1,487,649 | 3/1924 | Foreman | 144/312 X |
| 1,920,584 | 8/1933 | Osterberg | 83/102.1 |
| 2,077,119 | 4/1937 | Löf | 83/425.4 |
| 3,139,125 | 6/1964 | Pearson | 83/425.4 |
| 3,304,971 | 2/1967 | Pease | 144/312 |
| 3,368,597 | 2/1968 | Carter | 83/522 |
| 3,401,785 | 9/1968 | Ferrari | 83/102.1 |
| 3,693,675 | 9/1972 | Allen | 83/808 |

*Primary Examiner*—Donald R. Schran
*Attorney, Agent, or Firm*—Klarquist, Sparkman, Campbell, Leigh, Hall & Whinston

[57] ABSTRACT

A battery of vertical band saws is adjustable to vary the spacing between bands and is used to both edge and resaw material. A preparation table upstream from the saws receives material from a recirculating conveyor or from a head rig, orients the material in the most desirable position for cutting and transfers the material endwise to an infeed table. The infeed table has toothed conveyor rolls for feeding the material positively into the saws, an overhead pneumatic roll for engaging the top of the material while edging and driven side press rolls for pressing the material against a line bar when resawing.

Downstream from the saws an edge picker table has a pair of longitudinal separating plates normally aligned with the two outside saws for separating edge trimmings from the material to be processed into lumber. The plates are withdrawn from alignment with the saws when resawing. A sweep table receives material from the edge picker table and includes sweep fingers which sweep across the table for transferring material sideways to the recirculating conveyor and pivot downwardly to permit transfer of material endwise from such table.

12 Claims, 27 Drawing Figures

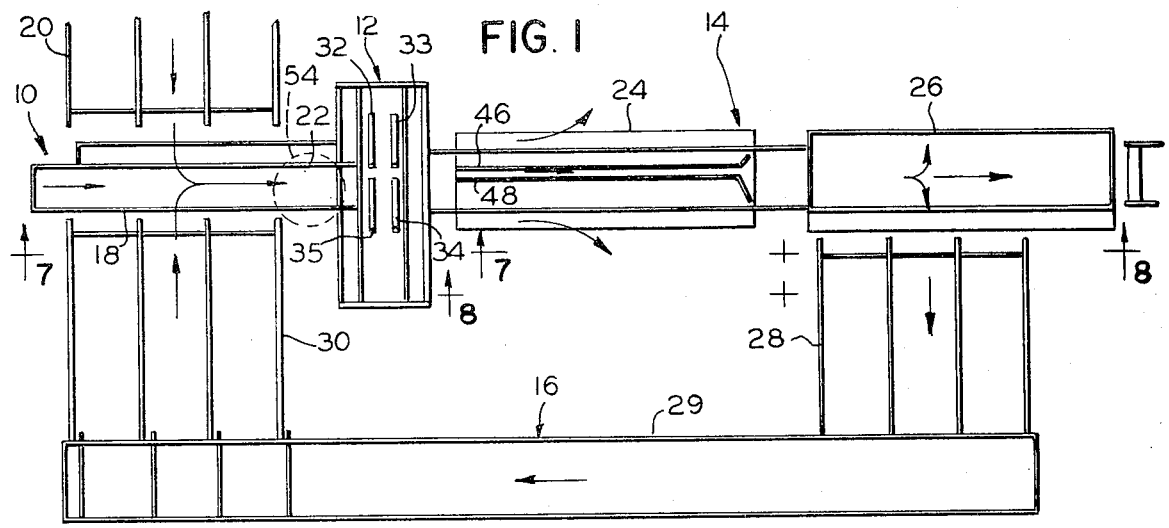
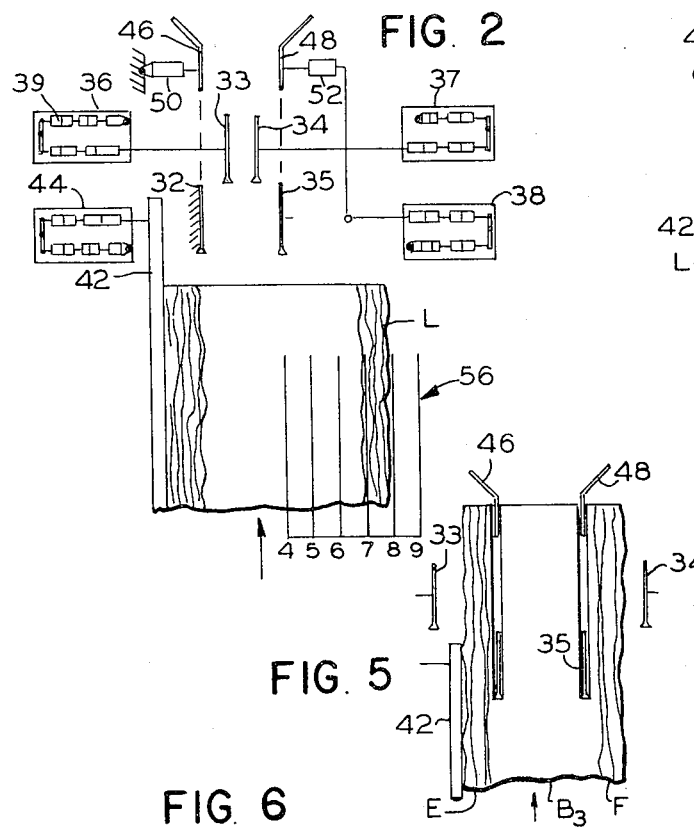
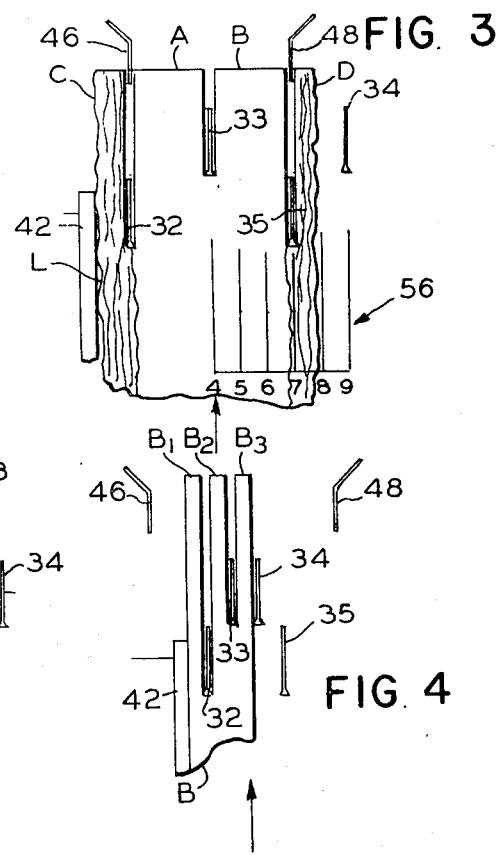
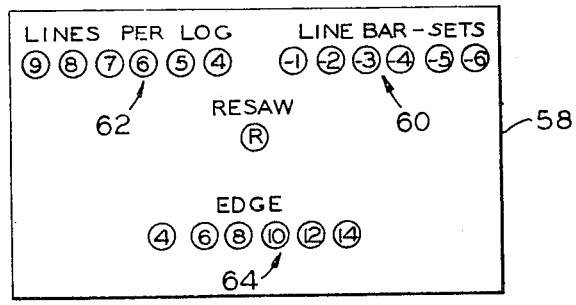

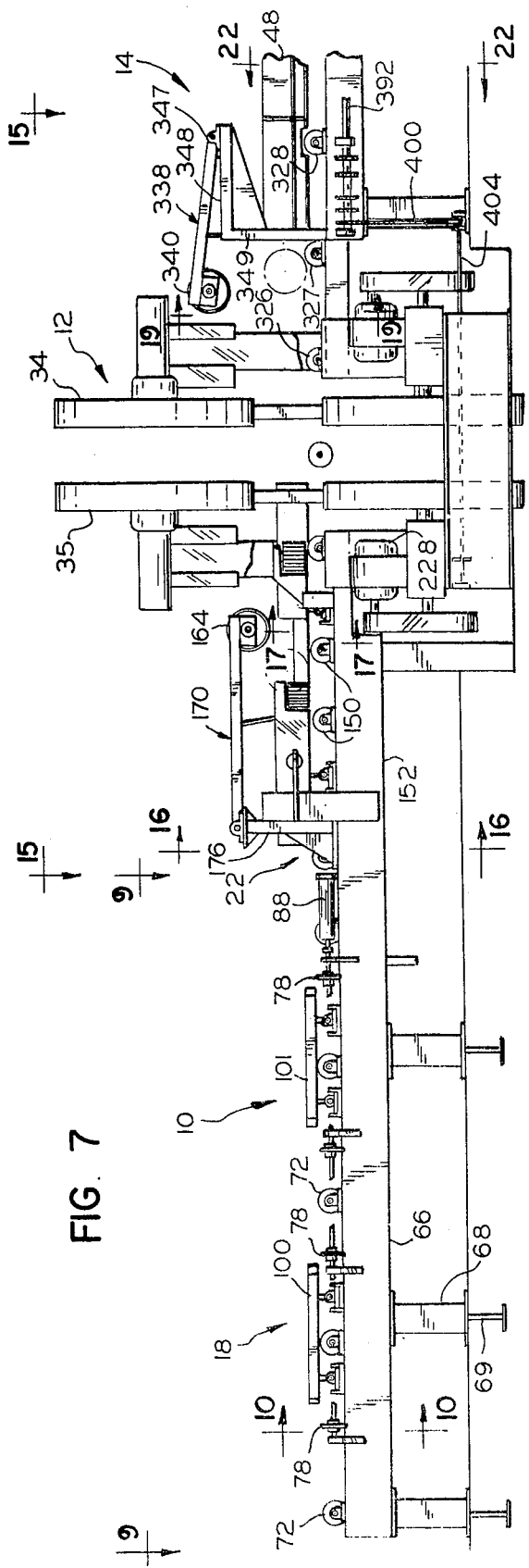
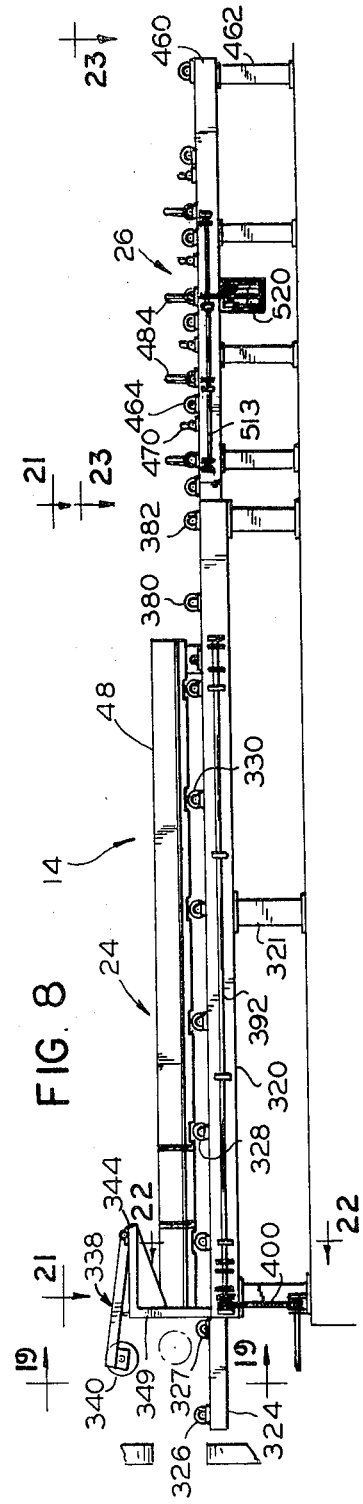
FIG. 7
FIG. 8

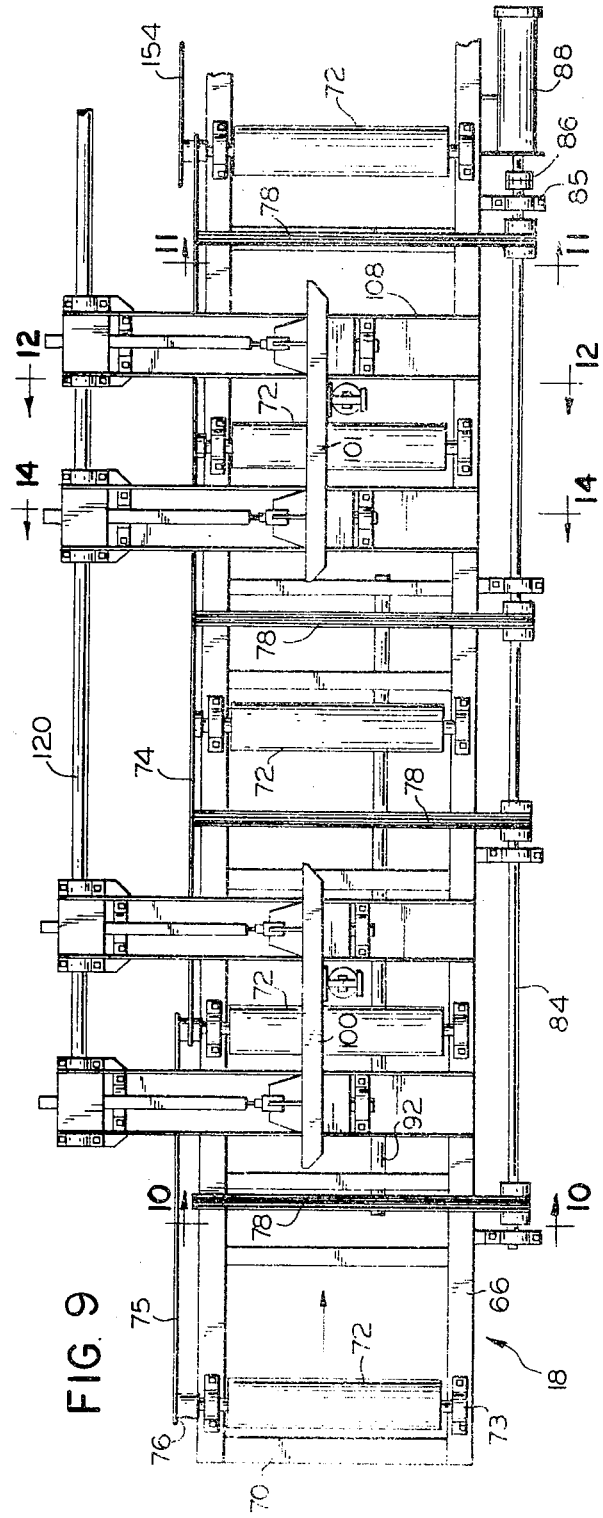
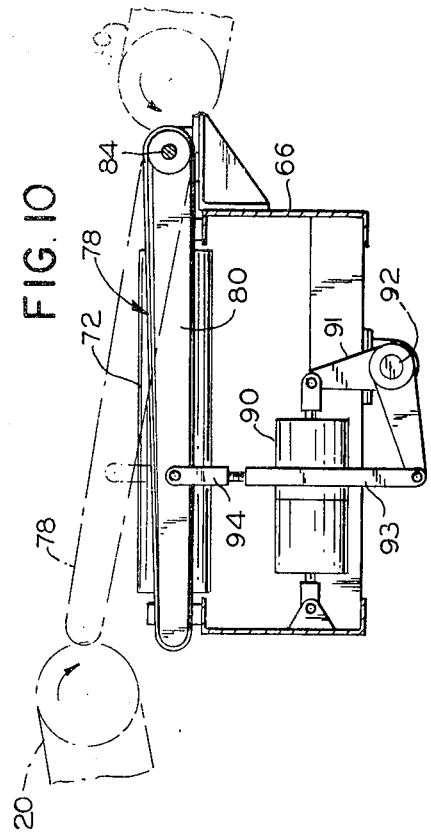
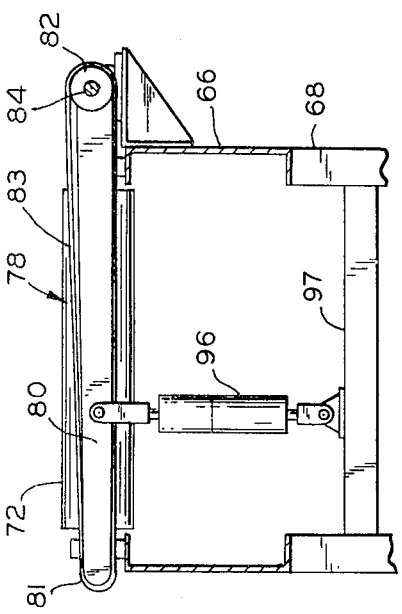

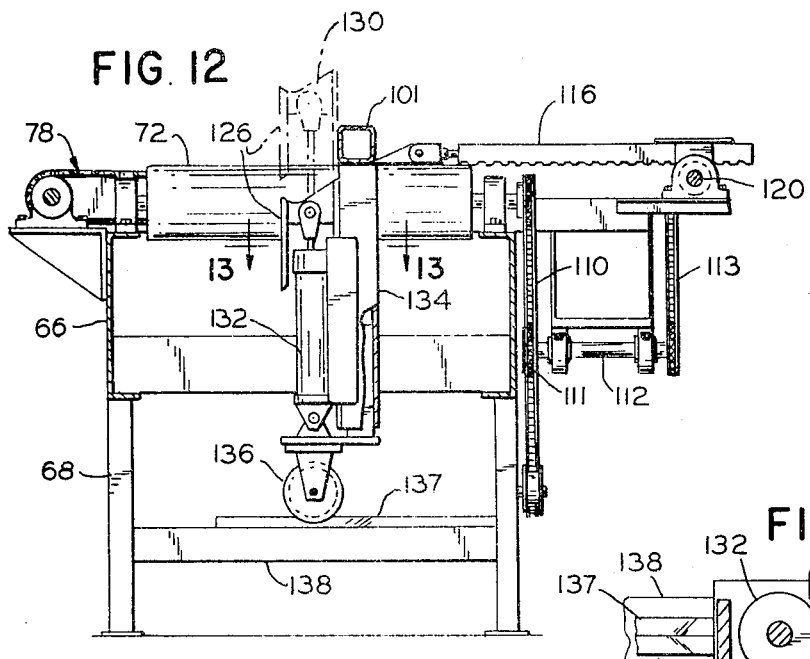
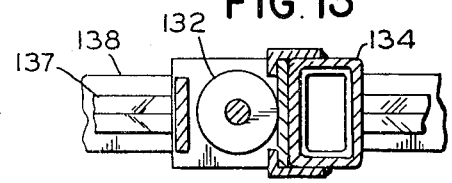
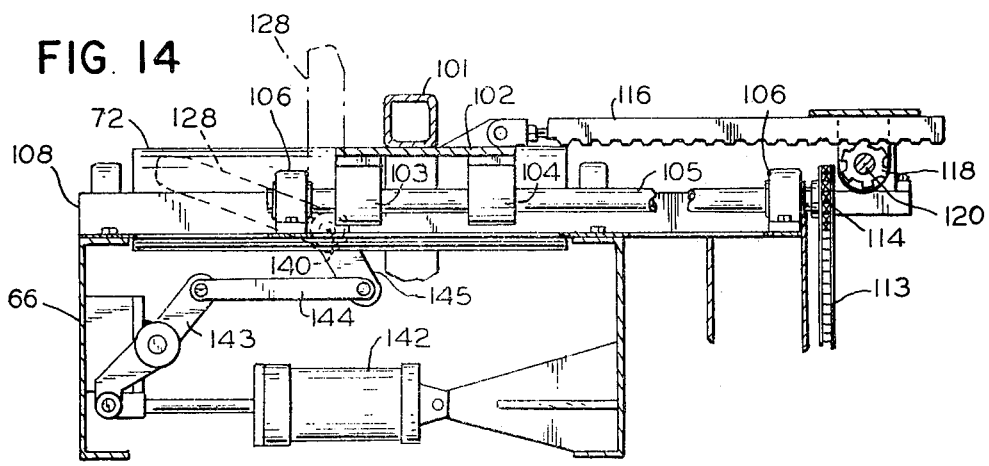

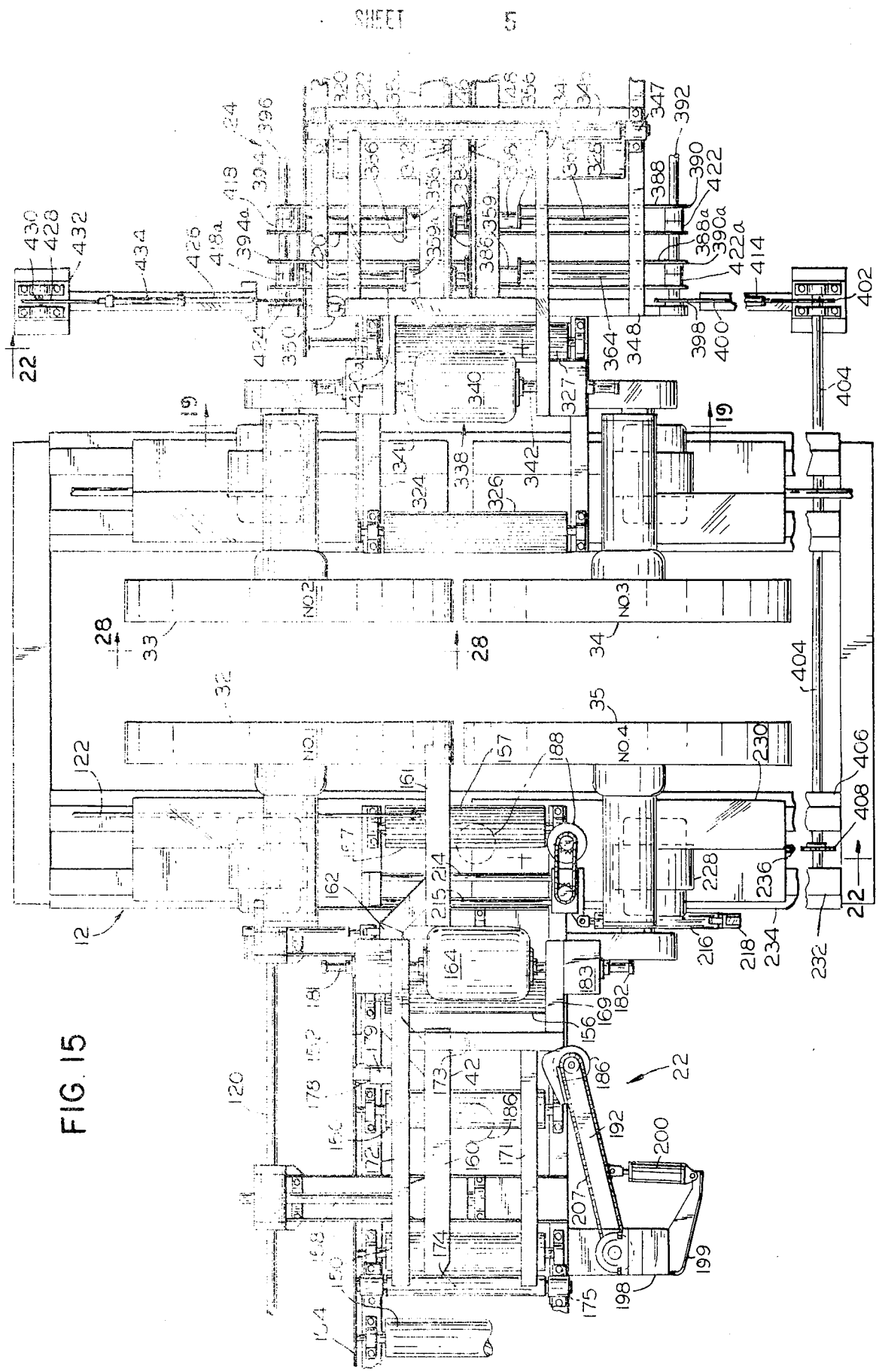

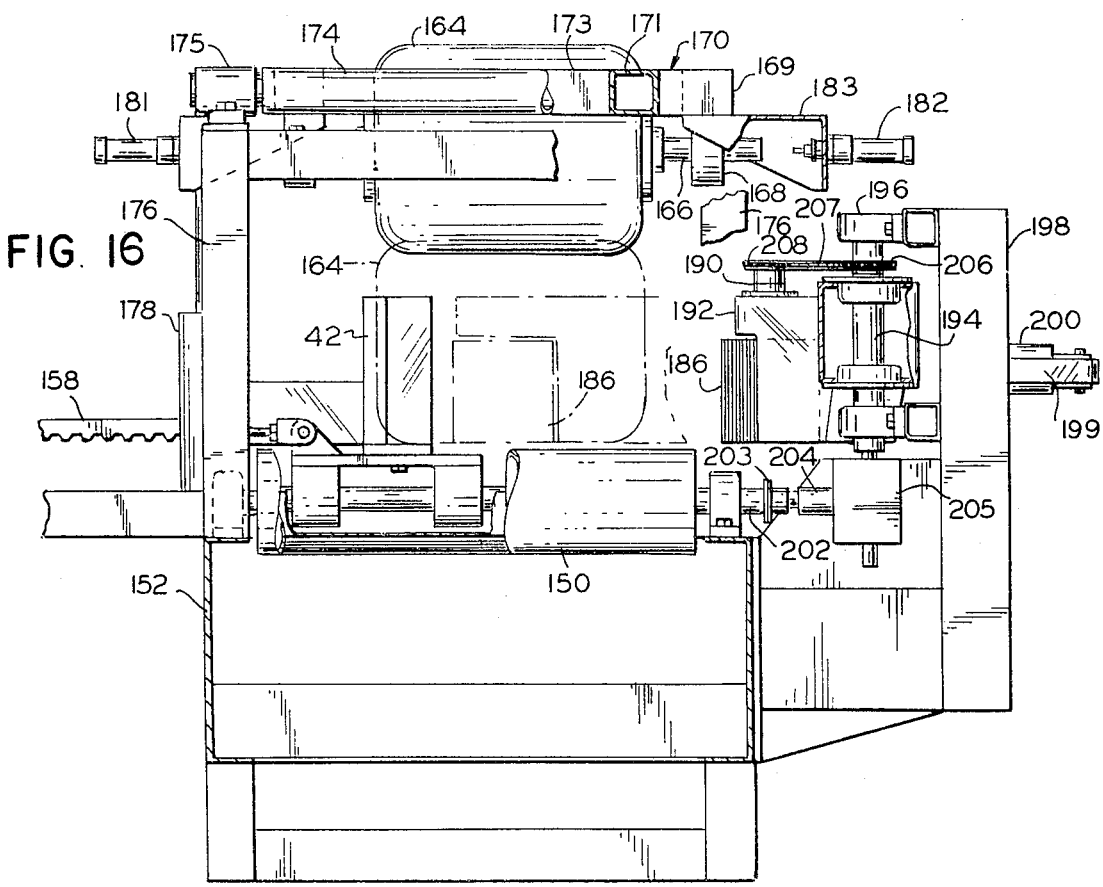
FIG. 16
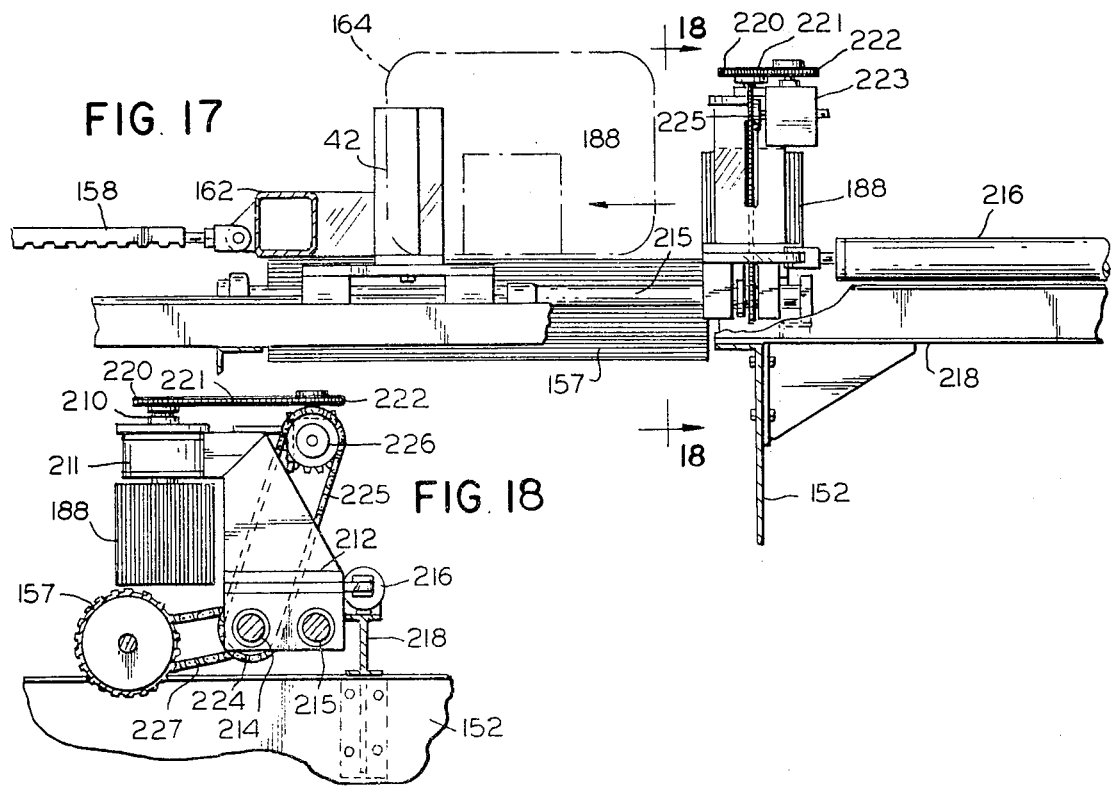
FIG. 17
FIG. 18

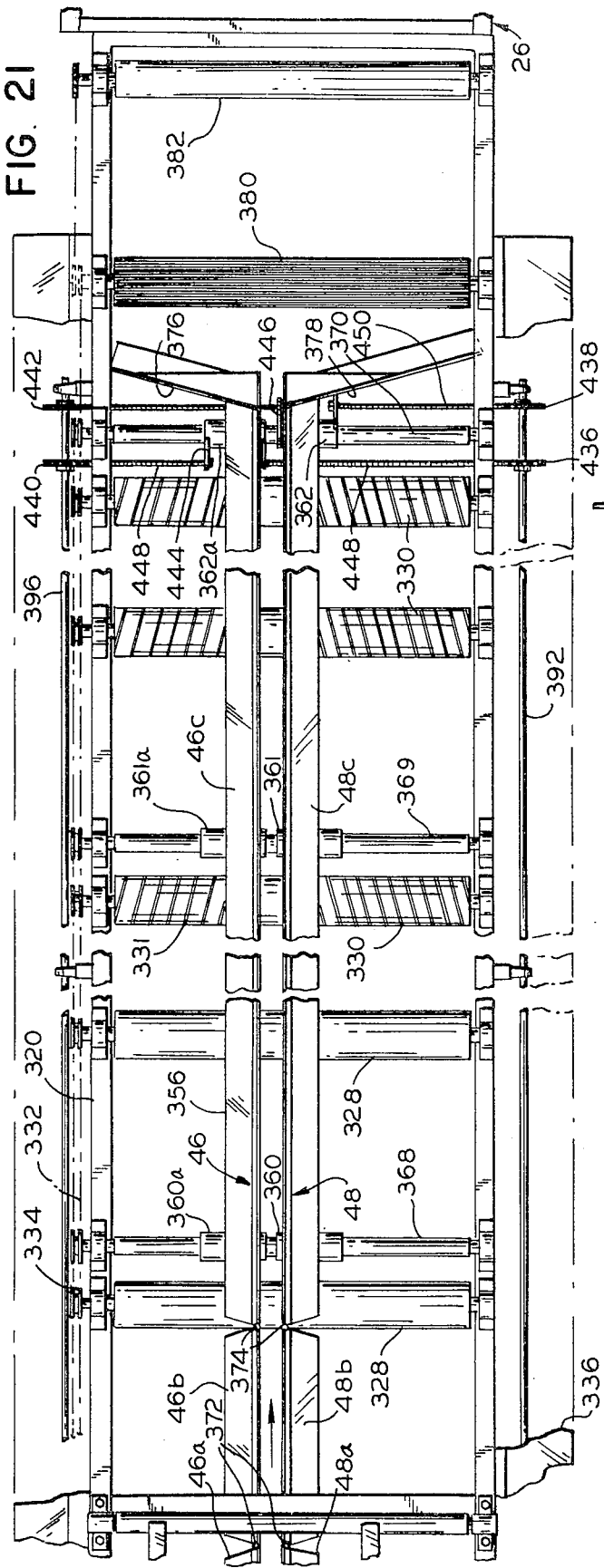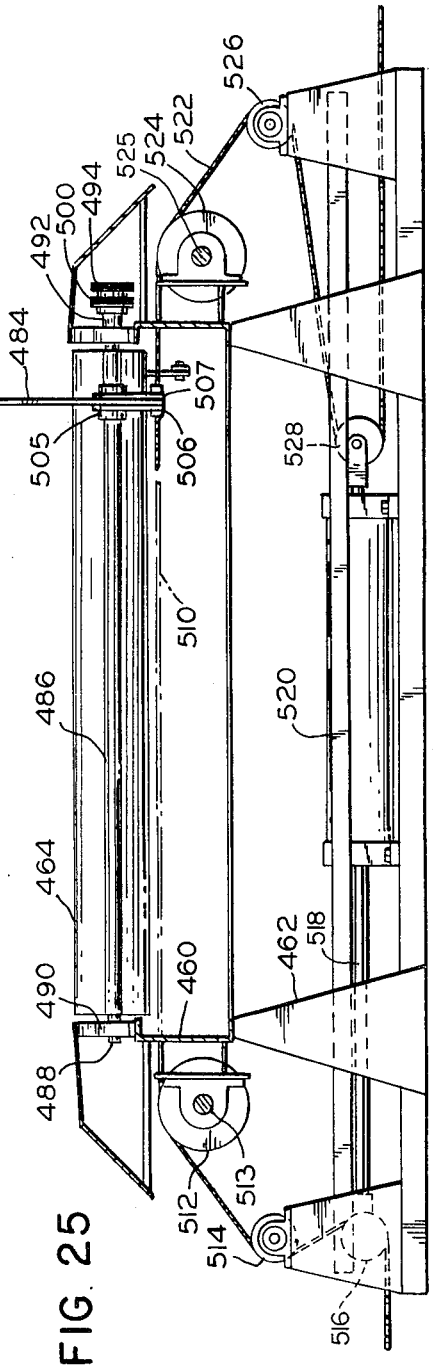

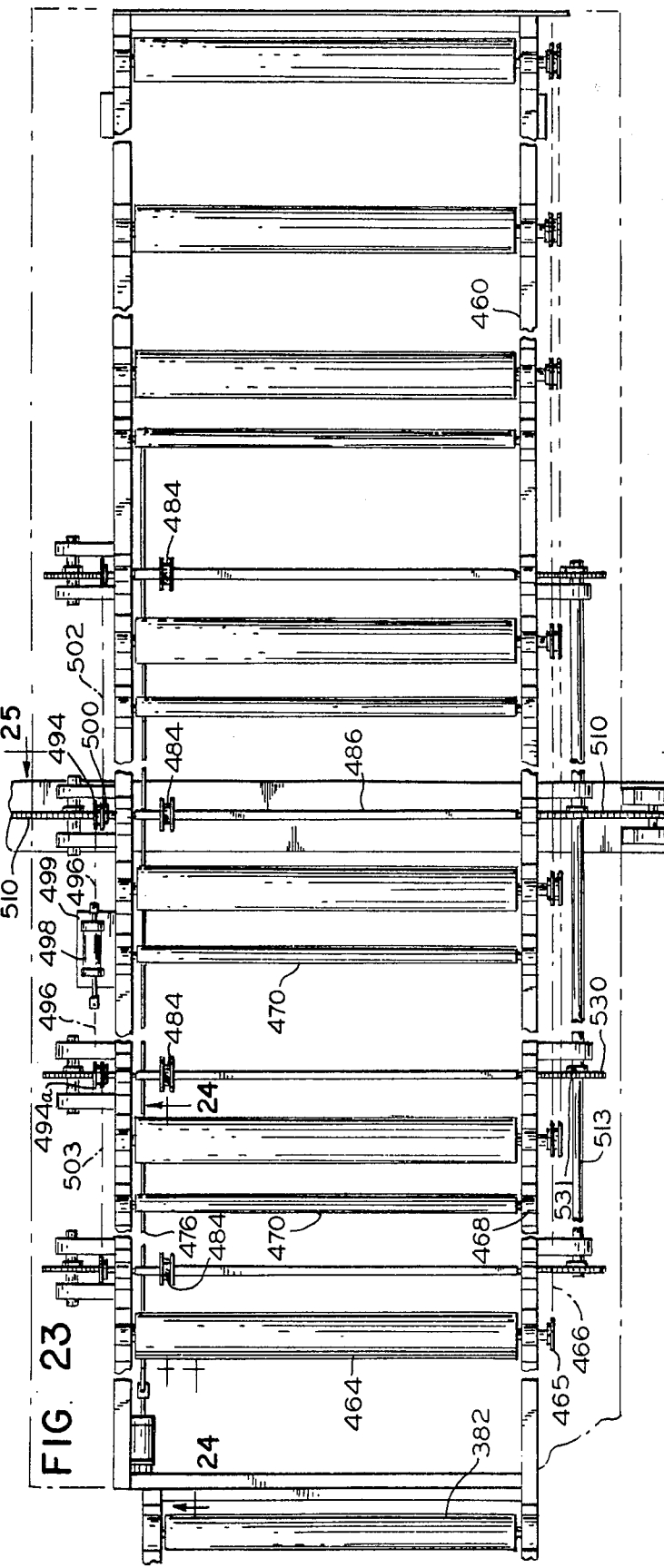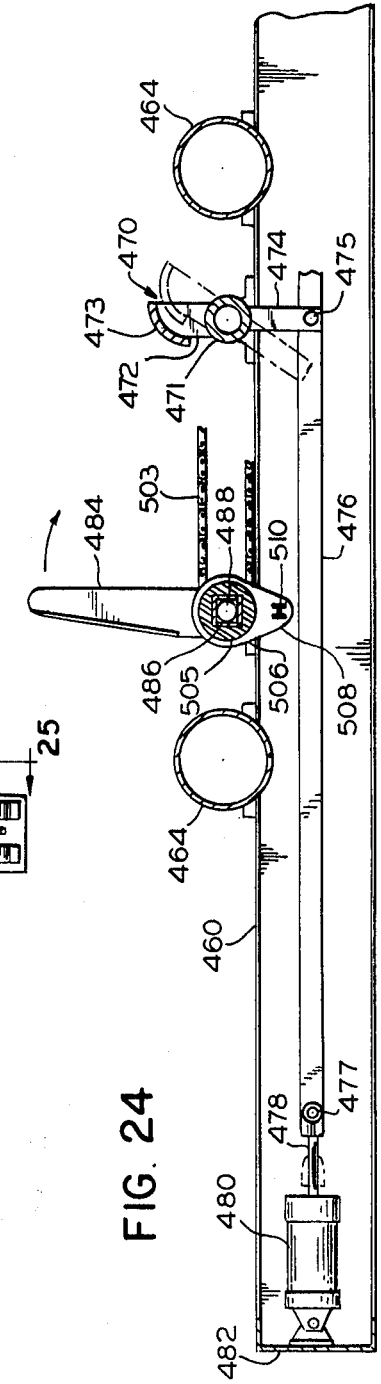

APPARATUS FOR EDGING AND RESAWING LUMBER

This is a division of application Ser. No. 885,389 filed Dec. 15, 1969.

BACKGROUND OF THE INVENTION

1. Field of the Invention

The present invention relates to the processing of logs into lumber, and more particularly to a machine capable of edging a log to form a cant, resawing the cant into boards and edging the boards, all using the same battery of saws.

2. Description of the Prior Art

Batteries of vertical band saws, some of which are transversely movable, have been used in the past to flatten two sides of a log for further processing by other saws downstream in the mill. A battery of such saws has also been used to resaw cants into boards after the cants have been formed by other saws upstream in the mill. Heretofore edging of lumber has been carried out by separate, usually circular saws which have the disadvantage of cutting a much wider kerf than band saws and therefore producing much greater waste. The prior need for having a separate specialized and expensive saw apparatus to perform each of the different functions of forming a cant, resawing a cant into boards and edging boards has required tremendous outlays of capital and large amount of floor space, which many small mill owners could not afford. Moreover, such prior operations require a continuously large supply of raw material for efficient operation, which is often available only to the largest of lumber companies.

SUMMARY OF THE INVENTION

In accordance with the present invention, the need for a specialized saw apparatus for performing each of the different cutting operations in processing a log into lumber is eliminated through the use of a single battery of vertical band saws having adjustable spacing between the individual bands in combination with supporting upstream and downstream components, many of which are unique in themselves. The combination can edge a log into cants, resaw cants into boards, and edge boards to predetermined widths. Furthermore, the combination is adapted for automated, one-man, remote operation.

Principal objects of the invention are to provide:

1. a machine capable of performing several sawing operations with a single battery of saws including edging logs to form cants, resawing cants into boards and edging boards to predetermined widths;
2. a method of processing a log into lumber using a single battery of saws;
3. a machine as aforesaid that is fast;
4. a machine as aforesaid that is accurate;
5. a machine as aforesaid that requires only one man to operate;
6. a machine as aforesaid that occupies minimum floor space;
7. a machine as aforesaid that is economical to manufacture, operate and maintain; and
8. a method of processing a log into lumber quickly and efficiently using a series of parallel lines superimposed lengthwise on the log or its image to estimate the number of boards of a desired thickness that can be cut from the log and to adjust the multiple saws accordingly.

BRIEF DESCRIPTION OF THE DRAWINGS

The foregoing and other objects and advantages of the present invention will become more apparent from the following detailed description which proceeds with reference to the accompanying drawings wherein:

FIG. 1 is a schematic plan view of an apparatus in accordance with the invention showing the flow of material therethrough;

FIG. 2 is a schematic view of the arrangement of saws, line bar and edging separator plates and setworks for the apparatus of FIG. 1;

FIGS. 3, 4 and 5 illustrate schematically examples of various arrangements of the saws, line bar and separator plates of FIG. 2 for performing different sawing functions;

FIG. 6 shows an example of a control panel for controlling the functions shown in FIGS. 3, 4 and 5;

FIGS. 7 and 8 are side elevational views showing all of the in line components of the apparatus of FIG. 1 as taken along the lines 7—7 and 8—8 of FIG. 1;

FIG. 9 is a plan view of the preparation table portion of the apparatus as taken approximately along the line 9—9 of FIG. 7;

FIG. 10 is a transverse sectional view taken along the line 10—10 of FIG. 9;

FIg. 11 is a transverse sectional view taken along the line 11—11 of FIG. 9;

FIG. 12 is a transverse sectional view taken along the line 12—12 of FIG. 9;

FIG. 13 is a horizontal sectional view taken along the line 13—13 of FIG. 12;

FIG. 14 is a transverse sectional view taken along the line 14—14 of FIG. 9;

FIG. 15 is a plan view showing the infeed table, the saw section, infeed portion and part of the outfeed portion of the apparatus taken along the line 15—15 of FIG. 7;

FIG. 16 is a transverse sectional view taken along the line 16—16 of FIG. 7;

FIG. 17 is a transverse sectional view taken along the line 17—17 of FIG. 7;

FIG. 18 is a vertical sectional view taken along the line 18—18 of FIG. 17;

FIG. 21 is a plan view taken along the line 21—21 of FIG. 8;

FIG. 23 is a plan view taken along the line 23—23 of FIG. 8;

FIG. 24 is a vertical sectional view taken along the line 24—24 of FIg. 23;

FIG. 25 is a transverse sectional view taken along the line 25—25 of FIG. 23;

DETAILED DESCRIPTION

General Assembly

Figure 19:
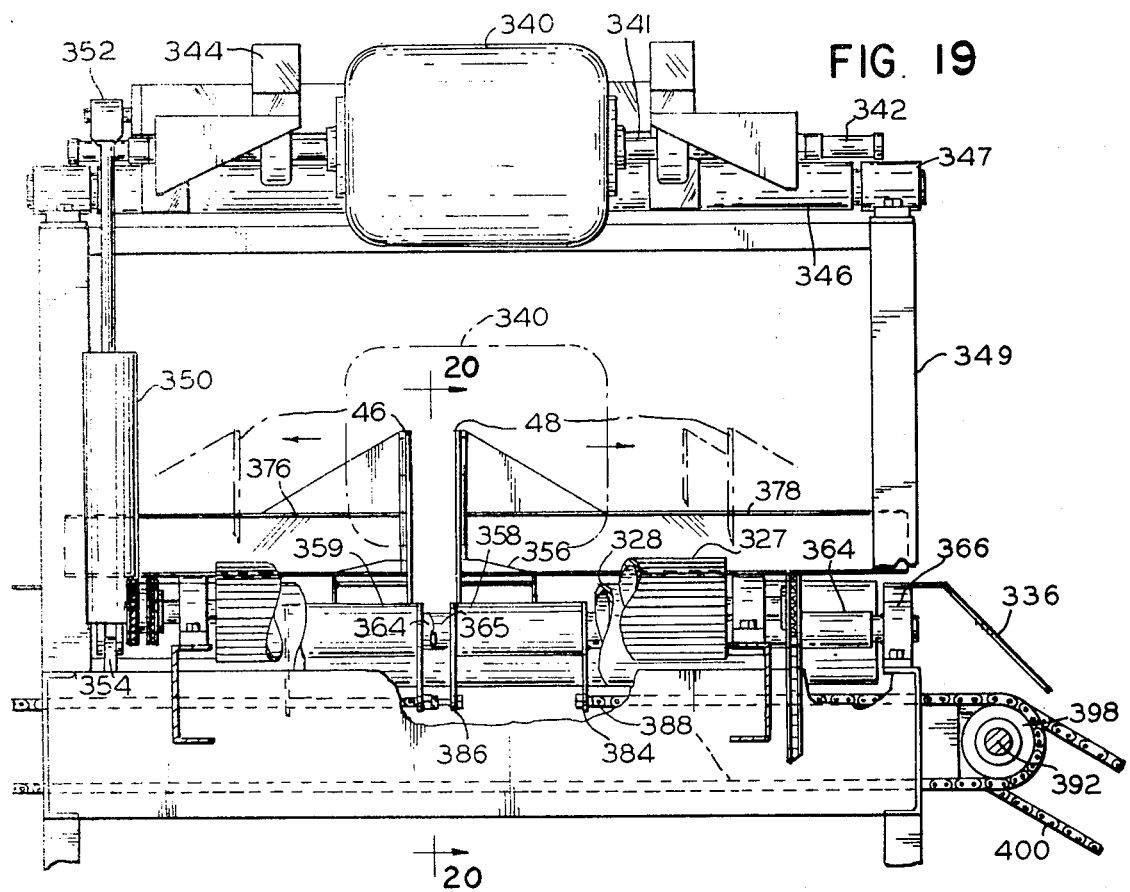
FIG. 19 is a vertical sectional view taken along the line 19—19 of FIG. 7.

In general, the combination edger-resaw apparatus of the present invention is composed of a series of distinct means or sections which, with reference to FIGS. 1, 7 and 8, include an infeed section 10, saw section 12, outfeed section 14 and recirculating conveyor or "merry-go-round" section 16. The latter section reconveys material from the downstream end of the outfeed section back to the infeed section for further processing in saw section 12.

The infeed section is further broken down into a preparation table 18 which can receive material conveyed sideways either from recirculating conveyor 16 or from a side transfer chain section 20 on the opposite side of such table, or endwise from apparatus (not shown) upstream from the end of the table. Transfer section 20 may transfer material from, for example, the main head rig of the sawmill, a chipping head rig or any other apparatus for putting at least one flat side on a log. Such table includes means for moving the material bodily sideways on the table and for turning or flipping the material in either direction about its axis until oriented as desired. The table also includes side transfer means for conveying material sideways from either side of the table onto the table. Just downstream from the preparation table an infeed table 22 functions to feed material positively and accurately into the multiple saws in saw section 12.

Outfeed section 14 is composed of two distinct components including an edge picker table 24 and a sweep table 26. The function of the edge picker table is to separate edge trimmings from the material to be made into finished lumber and to convey the trimmings sideways from the main conveyor line, while permitting the edged material to continue downstream to the sweep table. The function of the sweep table is to selectively convey the material in either one of at least two and possibly three different directions as desired, including sideways from the table to the recirculating conveyor for reprocessing or downstream from the end of such table.

The recirculating conveyor is typically made up of three sections including an offbear conveyor 28 made up of a series of parallel conveyor chains leading from one side of sweep table 26, a longitudinal conveyor section 29 parallel to the saw line, and an infeed conveyor section 30 which carries the material sideways from conveyor section 29 back to the preparation table. Section 29 is usually made up of driven rolls or belts. Section 30 is typically composed of parallel chains.

Saw section 12 comprises a battery of multiple vertical bands saws which may be ganged in a series of two, three, four or more saws. In the illustrated embodiment, all but one of the saws is movable transversely of the path of material through the saws so that spacing between the various saws can be varied. The fixed saw serves as a reference for the other saws. In the illustrated apparatus there are four saw assemblies 32, 33, 34, 35 with only saw assembly 32 being fixed. Each movable saw is movable by its own setworks 36, 37, 38 indicated schematically in FIG. 2. Each setworks comprises a series of air or hydraulic cylinders 39 connected in tandem in a well-known manner. However, all of the saws may be adapted for lateral movement if desired.

Infeed table 22 mounts a line bar 42, also shown schematically in FIG. 2, which guides material into the saws and which extends into the saw section behind the No. 1 or fixed saw 32. The lateral movement of line bar 42 relative to the No. 1 saw is controlled by its own setworks 44. Alternatively, the line bar can be fixed and used as a reference and all of the saws moved relative to the line bar.

Edge picker table 24 includes a pair of upright and longitudinally extending separating plates 46, 48 shown schematically in both FIGS. 1 and 2. Plate 46 is normally aligned b ngitudinally with the No. 1 or fixed saw 32, and plate 48 is normally aligned with the No. 4 or outermost movable saw 35. Plate 48 is operatively connected to setworks 38 of the No. 4 saw so as to move therewith and thus maintain its alignment with such saw. Separating plates 46 ad 48 function while the saws are edging to separate the major portion of the material to be processed into lumber from the edge trimmings which usually will be processed later into chips. As shown in FIG. 2, either one or both plates 46 and 48 can be retracted out of alignment with their respective saws by cylinders 50, 52 during the resawing operation.

General Method of Operation

The general method of operation of the machine is illustrated schematically in FIGS. 3, 4 and 5 through use of a control panel 58 shown in FIG. 6. The machine can be operated by a single operator positioned in an overhead control cage, usually positioned above infeed table 22 just upstream from saw section 12 in approximately position 54 indicated by dashed lines in FIG. 1.

Referring to FIg. 2, means are provided for casting shadow lines or otherwise superimposing fixed lines indicated generally at 56 in a well-known manner on or in front of a log L approaching the saws so that an operator looking down on the approaching log can see immediately how many "good lines," or in other words, how many good boards, may eventually be cut from the log. The log L has been flattened on at least one side in another machine and approaches the saws with the flattened side facing down. In the illustrated machine, the No. 1 saw 32 serves as a zero reference for the line bar 42 and the movable saws.

With log L approaching the saws, the operator estimates that line bar 42 should be set approximately two inches to the right of saw 32 so that such will line up just inside the bark-covered right-hand edge portion of the log. He therefore presses the —2 one of the line bar minus sets buttons 60, which is programmed to transmit the necessary signal to the line bar setworks 44 to adjust the line bar two inches to the right of such saw. Line bar buttons 60 are set to adjust the line bar at one-inch increments to the right of the No. 1 saw as indicated on the buttons.

The operator may estimate that there are seven "good lines" in the log L approaching in FIG. 2. He therefore pushes button No. 7 of the "lines per log" buttons 62 on control panel 58. Such button is programmed to activate saw setworks 36, 37, 38 to align the No. 4 saw along the No. 7 lines per cut line, position the No. 2 saw midway between the No. 1 and No. 4 saws and pull the No. 3 saw out of the cut altogether, as shown in FIG. 3. With the saws thus positioned, they cut log L into two cants A and B as indicated in FIg. 3, which pass downstream between separator plates 46, 48. At the same time the separator plates guide edge trimmings C and D outside the plates where means convey such trimmings off the side of such table.

Both cants A and B move downstream to sweep table 26 which sweeps them off the right-hand side of the table as shown in FIG. 1 to the recirculating conveyor, which returns them to preparation table 18. As cants return to the saws, the operator pushes resaw button R which automatically gangs the four saws and line bar equal distances apart. Pushing the resaw button can also automatically pull separator plates 46, 48 out of alignment with their respective saws. Both cants A and B can then be resawn as shown in FIG. 4.

After resawing, each of the three boards $B_1$, $B_2$, $B_3$ cut from cant B can be recirculated again by the sweep table for edging of each board to a predetermined width. For example, as shown in FIG. 5, a board $B_3$ having rough sides edges E and F is edged to a predetermined width by the Nos. 1 and 4 saws with the Nos. 2 and 3 saws pulled out of the cut. To preform this function with the illustrated machine, one of the "edge" buttons 64 is pressed, depending on the desired width of the board, that is, the desired distance between the Nos. 1 and 4 saws, The number on each such button indicates the spacing that such button will provide between the No. 1 and No. 4 saws. If the operator determines that board $B_3$ would form a good 8-inch board, he presses edge button 8, automatically setting the Nos. 1 and 4 saws eight inches apart. At the same time he pushes the apropriate line bar button 60 to remove the desired thickness of edge E on the right-hand side of the board as shown in FIG. 5. The edge buttons 64 are programmed to pull the Nos. 2 and 3 saws out of the cut when pressed.

From the foregoing it will be apparent that the apparatus is capable of carrying out at least three different sawing functions; first, edging or breaking down a log to form cants; second, resawing cants into boards of equal thickness; and third, edging each of the boards formed by the resaw or other operation.

As previously indicated, a suitable circuitry is provided for moving the saw and linebar setworks to the desired extent through activation, for example, of solenoid valves in conjunction with each setworks. The same circuitry controls movement of edging separator plates to the desired extent. As the description of the various components of the apparatus proceeds, it will be apparent that operation of various other components of the apparatus, such as the side press rolls, overhead rolls and sweep table, could also be programmed to operate automatically in the desired manner and at the desired time upon pressing one of the various buttons shown on the control panel for controlling the primary machine functions.

Preparation Table

The details of the preparation table 18 are shown most clearly in FIGS. 7 and 9 through 14. The table includes side channel frame members 66 supported on leg members 68, 69 and cross frame members 70. A series of driven rolls 72 are mounted in bearing members 73 on frame members 66. The rolls are driven through endless drive chains 74, 75 trained about drive sprockets 76 mounted on one set of ends of the roll shafts. The drive chains are driven by an electric motor (nto shown), controlled remotely by the operator in overhead cage 54.

The preparation table includes a series of side transfer means 78 capable of transferring material from either side of the preparation table sideways onto the table and positioning the material transversely at any desired position on the table. As shown best in FIGS. 10 and 11, each side transfer means includes an elongated chain bar 80 rotatably mounting sprockets 81 and 82 at its opposite ends. A endless chain 83 is trained about the bar and sprockets. Sprocket 82 is fixed to a driven shaft 84, while bar 80 is pivotable with respect to such shaft. As shown in FIG. 9, shaft 84 is common to all four of the side transfer mechanisms. Such shaft is mounted in bearings 85 at its opposite ends and coupled at 86 to a reversible air motor 88. Thus the shaft and the four side transfer chains can be rotated in either of opposite directions to transfer material from either side of the preparation table onto such table and to position the material at any desired transverse eposition on the table.

As shown in FIG. 10, the side transfer mechanisms are pivotable from inoperative positions below the upper level of rolls 72 to raised operative positions 78 above the level of the rolls to bring material onto the table. The pivoting means includes a double cylinder-and-linkage arrangement including horizontal double cylinder 90, a bell crank 91 on a shaft 92, and a vertical push rod 93 connected by a clevis 94 to chain bar 80. A slightly different pivoting arrangement is used for the single side transfer mechanism near the downstream end of the table as shown in FIG. 11. A simplified pivoting means can be used for this side transfer because of greater availability of space beneath the table at this point. The pivoting means includes a simple double vertical cylinder 96 connected at its lower end to a cross frame member 97 and at its upper end by a clevis to a chain bar 80. The double cylinders are used to achieve high and low infeed positions. The high position is used when bringing material onto the table from one side over the line bars. The low position is used when receiving material from the opposite side.

The preparation table also includes straightedge means extending longitudinally along the top of the table for use in determining the desired transverse position of the material on the table and guiding the material toward the infeed table and saws. Such means includes a pair of small line bars 100, 101 which are aligned longitudinally with primary line bar 42 of the infeed table. Furthermore, the small line bars move together with the large line bar through operation of line bar setworks 44. As shown best in FIGs. 12 and 14 with respect to small line bar 101, each such line bar is mounted on a plate 102 supported on sleeves 103, 104 adapted to slide along a cylindrical rod 105. The rod is rotatably supported in bearings 106 within a channel-shaped mounting member 108. There are two such mounting arrangements for each small line bar. Power to rotate rods 105 is taken off driven rolls 72 by a sprocket-and-chain transmission 110. Chain 110 transmits power to a sprocket 111 on a jack shaft 112. Shaft 112 transmits power through a sprocket and chain 113 upwardly to a sprocket 114 on rod 105.

Each plate 102 mounting each line bar 100, 101 is connected to a rack 116 which meshes with a pinion 118 fixed to a long continuous set shaft 120. Set shaft 120 transmits power from line bar setworks 44 to all of the racks for all of the small line bars and to the primary line bar as well. This will be most apparent from FIGS. 9 and 15. FIG. 15 shows a connecting rod 122 extending from the line bar setworks 44 to one arm 161 of primary line bar 42. As line bar 42 moves it transmits motion through its own racks 158 and pinions (not shown) to set shaft 120 to rotate the latter and thereby transmit motion to the two small line bars to the same extent and in the same direction through their respective racks and pinions.

The preparation table also includes means for turning or flipping material on the preparation table about its longitudinal axis for orienting the material most efficiently for cutting. Such means includes a first series of flipper means 126 shown in FIg. 12 for turning the material counterclockwise about its axis. Such means also includes a second series of flipper means 128 shown in FIG. 14 for turning the material in a clockwise direction about its axis and moving the material against line bars 100, 101. The flippers can also be used to hold a thin piece upright on edge against the small line bars.

Flipper member 126 has a hooked and inclined upper material-engaging surface 130 shaped to turn the log in the desired direction. Such flipper is moved vertically upwardly from its inoperative position below the upper level of roll 72 by a vertical power cylinder 132. Cylinder 132 is connected to a downward extension member 134 of line bar 101 so that the flipper moves back and forth across the table as dictated by movement of the line bar. However, the lower end of the cylinder 132 is connected to a wheel 136 adapted to roll along a track 137 on a cross frame member 138 of the table so that the high forces imposed upon the flipper when it strikes and lifts the heavy material are transmitted through the wheel to the frame of the table rather than to the line bar mechanism.

Flipper arm 128 pivots on a shaft 140 from a lowered position below the upper level of rolls 72 to a vertical position above such rolls. A horizontally mounted powered cylinder 142 actuates the flipper arm through a bell crank 143, linkage 144 and crank arm 145.

Summarizing the operation of the preparation table, material fed into either side of the table by the transfer chains 20 or 30 is tranferred onto the table by the side transfer chain sets 78. The side transfer chains are pivoted upwardly at the desired time to clear the rolls and line bars while their individual chains are rotated in the desired direction to convey the material onto the table. Thereafter the side transfer chains are lowered to rest the material on the rolls. The various flippers are then actuated to turn the material until it is in the most desirable orientation for cutting. Flippers 128 also push the material against the line bars to bring it into proper alignment with the saws. At the same time line bars 100 and 101 have been positioned transversely with the primary line bar 42 as determined by the operator pressing the proper line bar set button 60 on control panel 58. The material is then conveyed by driven rolls 72 onto the infeed table and toward the saws. Operation of the side transfer chains, flippers, rolls and line bars is controlled from the remote overhead operator's cage.

Infeed Table

Infeed table 22, shown most clearly in FIGS. 15, 16 and 17, forms a downstream continuation of the preparation table and is designed to feed the material positively and accurately into and through the saws at variable speeds.

The infeed table includes a series of driven rolls 150 which, like the rolls 72 of the preparation table, are supported in bearings on opposite longitudinal side frame members 152 forming continuations of the side frame members 66 of the preparation table. Driven rolls 150 are driven through a drive chain 154 and sprocket arrangement by a variable speed electric motor (not shown), the operation and speed of which is controlled remotely by the operator in cage 54.

The two conveyor rolls 156, 157 nearest the downstream end of the infeed table next to the saws are so-called "Coleman" rolls, well known in the lumber manufacturing industry. These rolls have longitudinally toothed surfaces for providing a positive gripping engagement with the material, thereby facilitating feeding of the material positively into the saws. Coleman rolls 156 and 157 are driven in the same manner as the plain rolls 150 and 72.

As previously indicated, primary line bar 42 is mounted to move across the infeed table for adjustment of its position relative to No. 1 saw 32. Such line bar extends downstream into saw section 12 of the apparatus just behind the blade of the No. 1 saw, as shown in FIG. 15 and schematically in FIGS. 2 through 5.

Line bar 42 is mounted in a manner substantially identical to the manner of mounting small line bars 100 and 101, already described. As previously mentioned, rod 122 from the line bar setworks moves line bar 42. This motion is transmitted through the pair of racks 158 to pinions on set shaft 120, to transmit such motion to the small line bars.

The primary line bar is composed of two arm sections 160, 161 forming the straightedge portion of the line bar. The arms are separated by an intermediate dog leg section 162 which is necessary to provide clearance for a vertically movable overhead roll 164.

With reference to FIGS. 15 and 16, overhead roll 164 is a hollow, resilient roll made of rubber or other resilient airtight material and is inflated under a low pressure. For example, a suitable roll is a so-called "Terra Tira" manufactured by B. F. Goodrich Company. The roll is mounted on a shaft 166 which is freely rotatable and freely shiftable longitudinally within bearing members 168. The bearings in turn depend from bearing support portions 169 of an overhead frame 170 which includes longitudinal frame members 171, 172 and a cross frame member 173. The rear ends of side frame member 171, 172 are fixed to a pivot shaft 174 pivoted at its opposite ends in bearings 175. The bearings are mounted on the upper ends of a pair of posts 176 supported on opposite side frame members 152 of the table. Roll 164 is pivoted from its raised inoperative position to its lowered operative position by upright actuating cylinder 178 connected at its lower end to the table and at its upper end to a projecting ear 179 of the overhead frame.

A pair of small inwardly directed air cylinders 181, 182 are mounted on overhead frame extensions 183 in alignment with and in their retracted positions spaced outwardly from the outer ends of overhead roll shaft 166. Each time the roll returns to its raised position, cylinders 181 and 182 extend to abut the outer ends of shaft 166 and center it and its supported roll 164 over the infeed table in readiness to engage the next piece of material.

The overhead roll is lowered to engage the top of the material only during the edging function of the saw.

Referring to FIGS. 15 and 16 the infeed table also includes a pair of side press rolls 186, 188 movable inwardly across the infeed table to press material against line bar 42 to aid in feeding the material into the saws and in maintaining exact positioning of the material with respect to the saws during the resawing operation.

The side press rolls are not used at all during the edging operation.

Each side press roll is a Coleman-type roll rotatable about a vertical axis and driven in a clockwise direction as viewed in FIg. 15 to aid in feeding the material positively into the saws. Side press roll 186 is fixed to a vertical shaft 190. Shaft 190 is rotatably mounted at the outer end of an arm 192. Arm 192 is mounted at its inner end for swinging movement about the axis of another vertical shaft 194. Vertical shaft 194 is rotatably mounted at its upper end in a bearing 196 supported by a vertical member 198 fixed to the infeed table. Vertical support 198 includes a horizontal arm extension 199 which mounts a power cylinder 200. The piston rod of such cylinder is connected to an intermediate portion of swinging arm 192 for pivoting side press rolls 186 from its retracted psition shown in solid lines in FIG. 15 to its operative position shown in dashed lines in the same figure.

Power for rotating press roll 186 about its vertical axis is taken off the shaft 202 of one of the driven conveyor rolls 150 is shown in FIG. 16. Roll shaft 202 is coupled at 203 to a shaft extension 204, which transmits power through a gear box 205 to a lower extension of vertical shaft 194. A sprocket 206 fixed to an upper portion of shaft 194 transmits power through a chain 207 to another sprocket 208 at the upper end of shaft 190 mounting press roll 186 to drive the roll. The driving connection between conveyor roll 150 and side press roll 186 is such that both rolls are timed and rotated to feed material into the saws at a speed as determined by the speed of the conveyor rolls.

Referring now to FIGS. 15, 17 and 18, the second side press roll 188 is movable along a straight path toward and away from line bar 42 because of the lack of space in the area of the saws where roll 188 functions. Rol 188 is fixed to a vertical shaft 210 which is rotatably mounted at the outer end of a horizontal arm extension 211 of a carriage 212. The carriage is mounted for sliding movement along a pair of parallel horizontal slide rods 214, 215 which extend across the table slightly below the upper level of the driven rolls. The carriage and its supported side press roll are moved across the table by a horizontally mounted power cylinder 216 which extends outwardly from one side of the infeed table and which is supported on an extension member 218 of the frame.

Press roll 188 is driven in a direction to feed material into the saws through a sprocket-and-chain drive arrangement which includes a first sprocket 220 at the upper end of shaft 210 and a horizontal chain 221 extending from sprocket 220 to a second sprocket 222. The second sprocket is mounted on a vertical shaft at the upper end of a gear box 223. Power is transmitted to the gear box from slide rod 214 through a sprocket 224 on the rod, chain 225 and sprocket 226 carried by a horizontal shaft of gear box 223. Shaft 214 is rotated through an appropriate drive connection 227 with one of the conveyor rolls such as roll 157. Sprocket 224 is keyed to shaft 214, but the keyway on such shaft is long while the key is short in length so that the sprocket can slide on such shaft with carriage 212.

The two side press rolls move simultaneously inwardly to press the material against the line bar during a resawing operation. Of course, the press rolls can be programmed to move in this manner automatically whenever the operator presses the resaw buttom on control panel 58. Similarly, overhead roll 164 can be programmed to lower into engagement with the material whenever the operator presses one of the lines per cut buttons 62 or one of the edging buttons 64 of the control panel.

Saw Section

Saw section 12 is perhaps illustrated best in FIGS. 7 and 15 as well as schematically in FIG. 2. The saw section is not shown in any great detail because all of the components thereof, with the exception of the saw guides, shown in detail in FIGS. 28 through 32, are conventional and have been manufactured, for example, by Albany Machine and Supply Inc., of Albany, Oregon, for many years.

Each saw is a conventional vertical band saw, with a wheel diameter of usually five or 6 feet, with the lower wheels individually driven by separate electric motors 228. Each saw includes a carriage portion 230 which mounts the motor and which is mounted for in-and-out sliding movement on a track portion 232 of a base member 234.

As previously mentioned, the No. 1 saw 32 can remain in a fixed position through the operation of the apparatus and therefore in such instance would have no setworks. However, each of the other saws is operatively connected through a connecting rod 236 to its associated setworks as illustrated with respect to the No. 4 saw 35. Vertical band saws moved in this manner to vary the spacing between the bands are well known in the industry. Reference if made to FIG. 2 and the accompanying description for an understanding of the positioning of the three movable saws to carry out the various sawing functions. Such saws can be ganged in batteries of two or more if desired, rather than four, depending on the requirements of the user.

Edge Picker Table

Referring expecially to FIGS. 15, 19, 20, 21 and 22, edge picker table 14 includes longitudinal side frame members 320 and cross frame members 322 supported on legs 321 and defining the general width of the major portion of the table. Additional side frame members 324 extend upstream from the main table into the saw section 12. This upstream extension of the table is of slightly narrower width than the major portion of the table and mounts a pair of Coleman rolls 326, 327 which are driven in a direction tending to pull material downstream through the saw section.

The main portion of the picker table includes a series of plain driven rolls 328, and at the downstream end thereof three screw rolls 330 provided with spiral ribs 331. All of the ribbed and plain rolls are driven in the same direction through a drive chain 332 and drive sprockets 334.

The spiral ribs 331 on screw rolls 330 are wrapped around the rolls in opposite directions on opposite sides of the pair of separating plates 46, 48 so that material on opposite side of such plates is conveyed off the opposite sides of the edge picker table. To facilitate side movement of edge trimmings from the picker table without damage to drive elements, the sides of the table are provided with downwardly inclined shielding 336 as shown best in FIGS. 19 and 21.

Just downstream from the saw section the outfeed table mounts a second overhead roll assembly 338 which is generally similar in construction and operation to the overhead roll structure on the infeed table. The function of the two overhead rolls is also the same in applying a downward force against the top of material during the edging operation to prevent the material from wandering sideways as it moves through the saws.

As shown best in FIGS. 15 and 19, the overhead roll structure includes a resilient pneumatic roll 340 fixed to a shaft 341 which is freely rotatable and shiftable axially in its bearing supports. Air cylinders 342 outwardly of the opposite end of shaft 341 recenter the shaft and roll with respect to the outfeed table upon each return of the roll to its inoperative position. The roll and its supporting shaft is carried by an overhead frame structure 344 which is connected to a pivot shaft 346 which pivots in bearings 347 on side frame members 348. The side frame members extend forwardly to a pair of support posts 349 carried by the upstream end of the picker table.

An upright power cylinder 350 has a piston rod connected to the overhead frame 344 at 352, with the lower end of the cylinder being connected to the edge picker table at 354.

As with overhead roll 164, the downstream overhead roll 340 can be programmed to automatically lower to engage the material whenever a lines-per-cut button 62 or edge button 64 is pressed on control panel 58.

Separator plates 46 and 48 each include a flange portion 356. Two pairs of full mounting sleeves 358, 358a, 359, 359a are attached to the underside of the flanges at the forward ends of the shear plates. Pairs of half mounting sleeves 360, 360a, 361, 361a, 362, 362a are attached to such flanges at the intermediate and rear ends of the plates. The full sleeves slide along transverse guide rods 364, 365. These rods are rotatably mounted in bearings 366 at opposite sides of the table and driven through the same chain-and-sprocket drive system that drives conveyor rolls 328. Similarly, the half sleeves slide on rods 368, 369, 370. These rods are also rotatably mounted in bearings at opposite sides of the table and rotated through the same chain-and-sprocket drive system as the conveyor rolls. The guide rods are rotated to faciliatate sliding movement of the separating plates without binding and with minimum friction and wear.

Each separating plate 46, 48 is divided into three separate sections including a short front section 46a, 48a, a relatively short intermediate section 46b, 48b, and a relatively long rear section 46c, 48c. The three sections of each plate are hinged together at vertical hinges 372, 374. The hinged sections permit accurate lateral movement of the front section or any other section of each plate while tending to minimize binding of the plate on the slide rodss as might otherwise occur because of the long length of each plate.

The rear ends of the rear sections 46c, 48c of the two separator plates flare outwardly to form stops 376, 378. Edge trimmings moving downstream on the picker table outside the separator plates strike stops 376, 378 to end their downstream movement. Thereafter such trimmings are worked off the opposite sides of the table by the screw rolls 330. As this occurs, material fed downstream between the separator plates continues downstream under the influence of conveyor rolls 328 and the plane central portions of the screw rolls onto a pair of transfer rolls at the downstream end of the edge picker table. The transfer rolls include a Coleman roll 380 and a plain roll 382 rotatably mounted at their opposite ends on downstream extensions of side frame members 320 which join the edge picker table to the sweep table 26.

As previously indicated with reference to FIG. 2, separator plate 46 normally remains in alignment with the No. 1 saw 32 while means are provided for moving separator plate 48 in alignment with the No. 4 movable saw 35. Also as previously indicated, means are provided for pulling both separator plates out of alignment with their respective saws during resaw operations.

Figure 20:
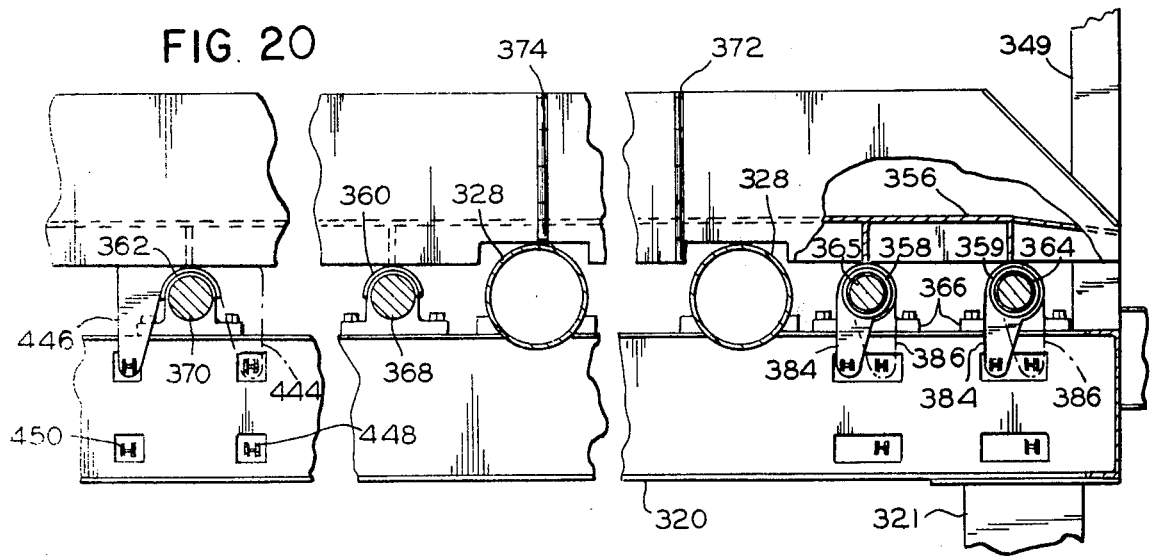
FIG. 20 is a vertical sectional view taken along the line 20—20 of FIG. 19.

These means include a pair of ears 384 extending downwardly and to one side from opposite ends of each of full sleeves 358, 359 and another pair of ears 386 extending down and to the the opposite side of sleeves 358a, 359a, as shown best in FIGS. 15 and 20. A pair of cross chains 388, 388a connect at one end to ears 384 of sleeves 358, 359 and extend about driven sprockets 390, 390a keyed to a longitudinal shaft 392 at one side of the picker table. From there the chains extend back beneath the table and about idler sprockets 394, 394a rotatable on a second shaft 396 extending along the opposite side of the picker table. From these idler sprockets, the chains extend back beneath the table and connect at their opposite ends to the other ears 384 of sleeves 358, 359 of separator plate 48.

Figure 22:
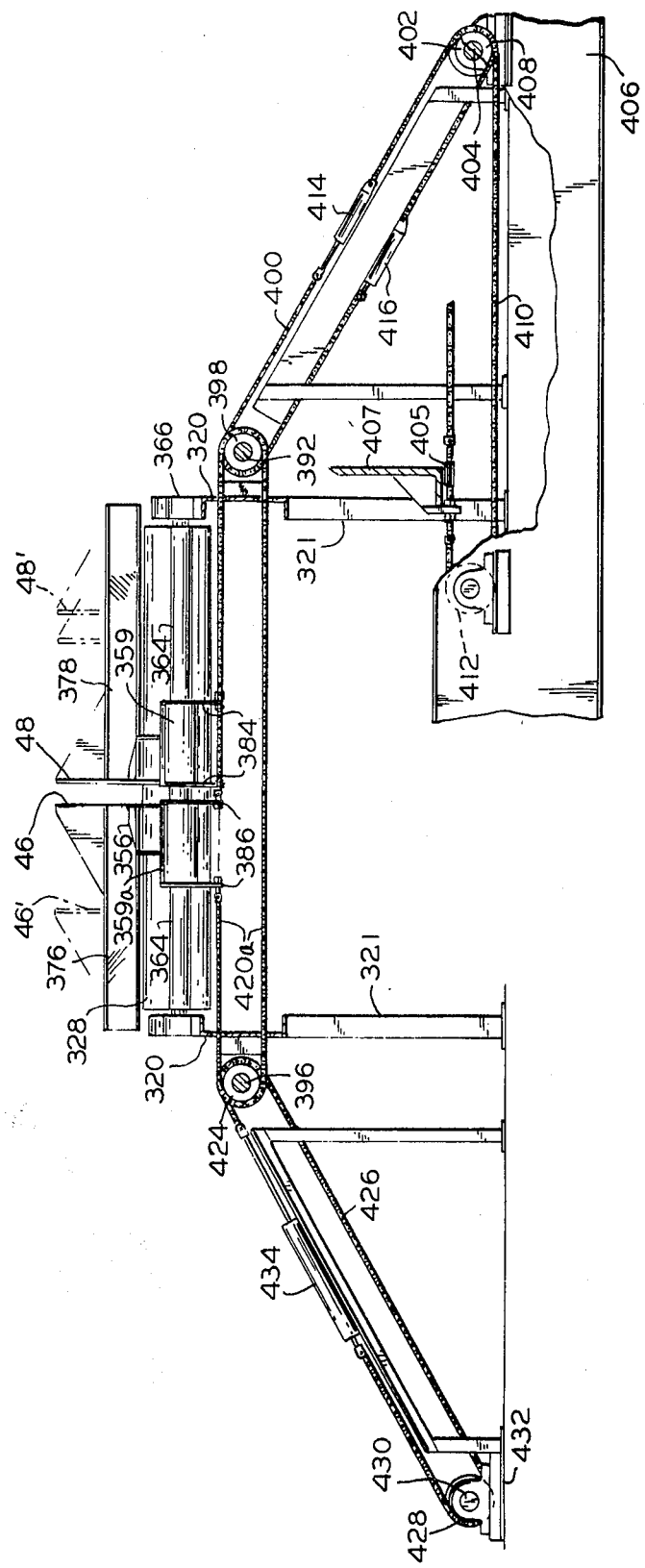
FIG. 22 is a transverse sectional view taken approximately along the line 22—22 of FIg. 15.

Another driven sprocket 398 keyed to the upstream end of shaft 392 receives a chain 400 which extends downwardly at an inclination to another sprocket 402 on a jack shaft 404. This shaft extends toward the No. 4 saw, and its opposite end terminates at a subframe portion 406 of such saw as shown in FIG. 22. A sprocket 408 on the opposite end of shaft 404 is connected by a chain 410 to another sprocket 412. Chain 410 has a direct connection 405 with a movable frame portion 407 of the No. 4 saw 35 so that movement of such saw by its setworks 38 moves chain 410 through an equal distance.

Summarizing, movement of the No. 4 saw by its setworks drives chain 410 which transmits motion through shaft 404, chain 400, shaft 392 and chains 388, 388a to sleeves 358, 359 of separator plate 48, thereby providing a corresponding movement of such plate.

Because the No. 1 saw has no movement corresponding to the movement of the No. 4 saw, there is no need to provide a similar driving connection between the No. 1 saw and the opposite separator plate 46.

The means for pulling separator plate 48 out of alignment with the No. 4 saw includes a pair of power cylinders 414, 416 provided on opposite lengths of chain 400. The piston rods of such cylinders extend toward the upper drive sprocket 398 for such chain with the piston rod of the lower cylinder 416 normally being retracted and the piston rod of the upper cylinder 414 normally being extended. Thus when it is desired to pull separator plate 48 out of alignment with the No. 4 saw, the piston rod of cylinder 414 is retracted and the piston rod of cylinder 416 is simultaneously extended. This action rotates shaft 392 and chains 388, 388a in the desired direction for pulling plate 48 to the position 48' shown in FIG. 22. Moreover, because of the arrangement of cylinders 414, 416, this movement is achieved without moving the lower part of chain 400 and thus without moving the No. 4 saw.

The retracting means for plate 46 can be less complicated than that for plate 48. Thus a pair of sprockets 418, 418a fixed to shaft 396 receive cross chains 420, 420a which extend beneath the table and connect at one end to one ear 386 of sleeves 358a, 359a. The same chains extend from sprockets 418, 418a beneath the table to the opposite side thereof and about idler sprockets 422, 422a on shaft 392 and then beneath the table again to connect at their opposite ends to the other ear 386 of sleeves 358a, 359a. Another sprocket 424 fixed to the upstream end of shaft 396 is connected by a chain 426 to a sprocket 428 on a stub shaft 430 rotatably mounted in a base member 432. A double-acting cylinder 434 in chain 426 is extended in one direction s shown in FIG. 22 to align plate 46 with the No. 1 saw and is extended in the opposite direction to retract plate 46 out of alignment with the No. 1 saw to the position 46'.

As will be apparent from FIG. 21, longitudinal shafts 392 and 396 extend the full length of the edge picker table and mount additional sprockets 436, 438 on shaft 392 and sprockets 440, 442 on shaft 396 near the opposite end of the table. Cross chains 448, 450 passing beneath the table from these sprockets connect to ears 444, 446 (FIG. 20) of half sleeves 362 to drive the rear ends of the plates at the same time and to the same extent as the front ends of the plates.

More specifically, chain 448 is attached at one end to one of the pair of ears 444 and extends about idler sprocket 436 and back beneath the table and around sprocket 440 fixed to shaft 396 and then attaches at its opposite end to the other ear of the pair 444. Thus rotation of shaft 396 through the activation of double-acting cylinder 434 will move the rear end of separator plate 46 to the same extent and in the same direction as the front end thereof.

Similarly, second chain 450 is connected at one end to one of the pair of ears 446. Such chain extends about the drive sprocket 438 fixed to shaft 392 and then back beneath the table and about idler sprocket 442 on shaft 396 to connect at its opposite ends to the other ear of the pair 446. With this arrangement, rotation of shaft 392 either through action of the cylinders 414, 416 or through operation of the No. 4 saw setworks provides movement of the rear end of separator plate 48 corresponding to the movement of the front end of the same plate.

As with other components of the machine, the separator plates can be programmed to move as required upon actuation of certain buttons of the control panel 58. For example, by pushing one of the lines-per-cut buttons 62 or one of the edge buttons 64, either one indicating an edging function, the drive means for the separator plates can be programmed to align plate 48 with the No. 4 saw and plate 46 with the No. 1 saw. Similarly, upon pressing the resaw button, the drive means for the separator plates can be programmed to automatically activate cylinders 414, 416 and 434 to pull the plates 46, 48 out of alignment with their saws.

Sweep Table

The details of sweep table 26 are shown in FIGS. 23, 24 and 25. The sweep table includes longitudinal side frame members 460 forming continuations of the side frame members of the edge picker table and supported on legs 462. A series of plain driven rolls 464 are journaled in bearings on the opposite side frame members and driven through sprockets 465 and a drive chain 466 in a direction for conveying material downstream on the table.

Also carried in bearings 468 on side frame members 460 are a series of four skid lifts 470. As shown in FIG. 24, each skid lift includes a rotatably mounted shaft portion 471, a lift skid arm 472 extending upwardly from the shaft and a curved skid surface 473 at the outer end of such arm. An actuating arm 474 extends downwardly from the shaft and is pivoted at 475 to an actuating rod 476 which extends along the inside of one of the side frame members 460 to interconnect all of the skid lifts. One end of actuating rod 476 is connected at 477 to a piston rod 478 of a power cylinder 480. The power cylinder is connected to a cross frame member 482 at the sweep table's upstream end.

In the retracted position of piston rod 478, the surface of skid lift 470 is positioned below the upper level of the conveyor rolls 464 so that material can be conveyed downstream from the table on the rolls or table top. However, upon extension of the piston rod of the power cylinder 480, the skid lifts pivot to vertical positions wherein skid surfaces 473 are above the upper level of the conveyor rolls to lift material from the rolls and stop its downstream movement.

The sweep table also includes a series of four longitudinally aligned sweep fingers 484 which are mounted for sweeping movement across the table from one side to the other to push material form the skid lifts onto the recirculating conveyor system or to another system. The mounting means for each sweep finger includes a square tubular shaft 486 having round stub ends 488 journaled in bearings 490 on longitudinal side frame members 460. One round end of square shaft 486 has an extension 492 mounting a sprocket 494. A drive chain 496 extends from this sprocket to a double-acting power cylinder 498 mounted to the outside of one side frame member 460. The other end of the same chain is connected to the opposite end of the power cylinder and extends about another sprocket 494a on the shaft extension of an adjacent sweep finger shaft. The shaft extensions of the center two finger shafts also carry second sprockets 500, which are connected by other drive chains 502, 503 to other sprockets on the shaft extensions of the opposite end sweep finger shafts. Thus with cylinder 498 positioned as shown in FIG. 23, the four sweep fingers 484 all extend vertically above the upper level of conveyor rolls 464 and skid lifts 470. However, upon actuation of the cylinder 498 in the opposite direction, the sweep fingers pivot on their square shafts to lowered positions below the upper level of the conveyor rolls in the direction of the arrow shown in FIG. 24.

Each finger 484 is alos mounted for sliding movement along its square supporting shaft to achieve the desired sweeping action. For this purpose the lower end of each finger includes a wide base portion 505 having a square opening through which square shaft 486 extends. The outer periphery of base 505 is circular, however, and journals a pair of outer sweep members 506, 507 on opposite sides of the finger. Although the circular base 505 can pivot within the circular openings of sweep members 506, 507, the latter members are held against lateral sliding movement on base 505 by annular grooves (not shown) on such base.

Each sweep member 506, 507 has a downward extension 508. One end of a chain 510 is connected to the extension of member 506. Chain 510 extends from such connection over a sprocket 512 fixed to a long shaft 513, then over an idler sprocket 514 and about another sprocket 516 on one end of a piston rod 518 of a double-acting power cylinder 520 disposed transversely beneath the table. The opposite end of chain 510 is dead-ended at the same side of the table as sprocket 512.

One end of a second chain 522 is connected to extension 508 of sweep member 507. From such connection, chain 522 passes over a large sprocket 524 carried by a jack shaft 525 on the opposite side of the table from shaft 513. From sprocket 524, chain 522 passes over a smaller idler sprocket 526, and then about a sprocket 528 on the opposite end of piston rod 518. The opposite end of chain 522 is dead-ended at the opposite side of the sweep table from chain 510. With a drive arrangement as described and arranged as shown in FIG. 25, chains 510 and 522 pull sweep finger 484 along its square shaft toward the righthand side of the table when the piston rod extends in the direction shown and sweep the finger across the table in the opposite direction when the piston rod extends in the opposite direction.

With the arrangment described it will be apparent that material can be swept from either side of the table if desired. Alternatively the material can be transferred off the downstream end of the table by retracting the skid lifts and fingers.

Shaft 513 which mounts sprocket 512 at one side of the sweep table extends longitudinally along one side of the frame and is common to the mechanisms for moving all four sweep fingers along their cross shafts 486. Thus actuation of cylinder 520 to induce movement of the center one of sweep fingers 484 in FIG. 23 also induces rotation of shaft 513 so that such shaft transmits motion through other sprockets 530 and cross chains 531 connected in a similar manner to the other three sweep fingers, thereby causing simultaneous sweeping action of all four sweep fingers in the same direction.

If desired, the sweep table can be programmed to operate in a certain manner automatically upon pressing one of the buttons on control panel 58. For example, pressing of resaw button R could indicate that it is desired to recirculate the material back to the preparation table for recycling through the saws. Therefore a sweep table memory system would be programmed to position the fingers on the side of the sweep table opposite the recirculating conveyor and then raise the lift skids and fingers and sweep the fingers across the table toward such conveyor after material is received on the table, upon pressing resaw button R.

The sweep table memory system could also be programmed to operate the table components in a similar manner when one of the edge buttons 64 is pressed, since this would also indicate that it is desired to recirculate material back through the saws.

When neither the resaw button nor one of the edging buttons is pressed, the sweep table might be programmed to pivot the lift skids and sweep fingers to their inoperative positions below the conveyor rolls, so that the rolls convey the material downstream off the end of the sweep table.

Modified Sweep Table

Figure 26:
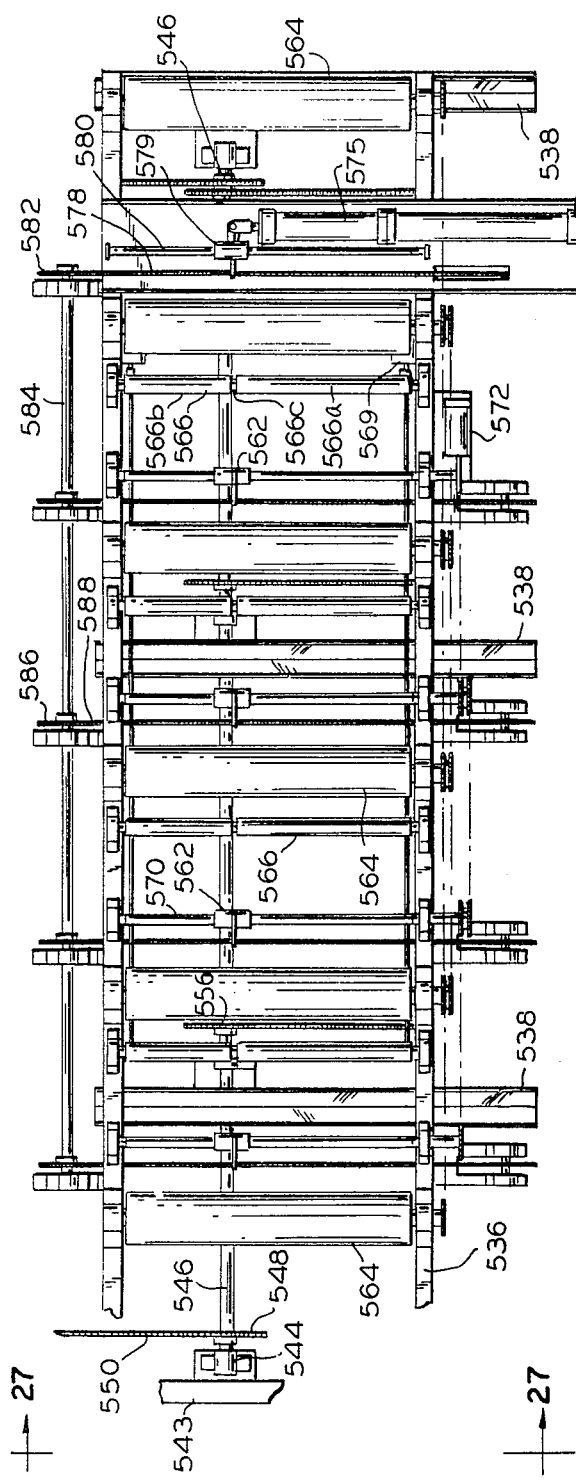
FIG. 26 is a plan view similar to FIG. 23 but showing a modified sweep table embodiment.
Figure 27:
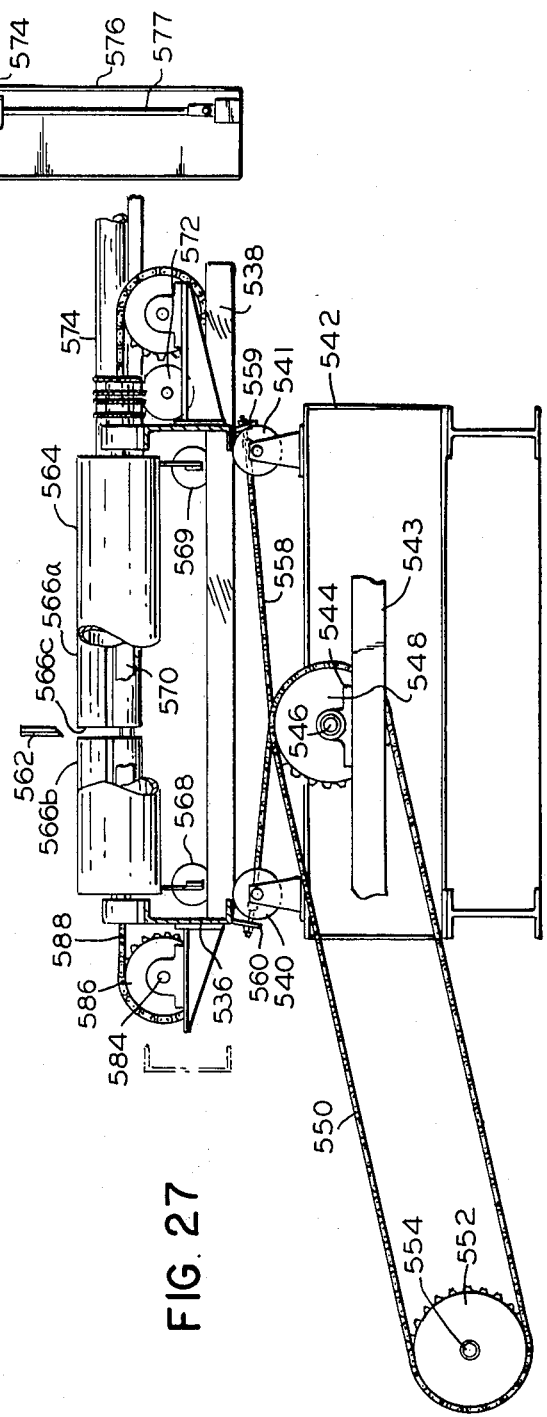
FIG. 27 is a transverse sectional view taken along the line 27—27 of FIG. 26.

FIGS. 26 and 27 illustrate a modified sweep table embodiment which is especially adapted to operate directly behind the saws in the absence of an edge picker table. Under such circumstances the modified sweep table serves to remove edge trimmings from opposite sides of the table and to convey all or portions of material to be processed into lumber downstream form the table. The modified sweep table also functions in the same manner as the previously described sweep table to recirculate material. However, the modified sweep table has the additional capability of sweeping one portion of cut material to one side of the table and another portion of such material to the opposite side of the table or downstream off the end of such table. The modified sweep table also maintains alignment of its sweep fingers with one of the movable saws through bodily transverse movement of the sweep table itself.

Most usually the modified sweep table is used in conjunction with an edger-resaw apparatus having only two vertical band saws with one saw being fixed and the other being movable toward and away from the fixed saw. In such application the modified table serves both as an edge picker during the edging operation and as a means for sweeping material to the recirculation conveyor for resawing or downstream to another processing station. In such application, the downstream overhead roll 340 is mounted on the upstream end of the sweep table.

With reference to FIGS. 26 and 27, the modified sweep table includes a rectangular frame including longitudinal side frame members 536 tied together at intervals by appropriate cross frame members. A series of transverse track members 538 extend across lower portions of side frame members 536 and outwardly beyond one such side frame member. These track members are each supported on a pair of rollers 540, 541 mounted at opposite sides of a stationary base frame 542. Thus in effect the upper portion or superstructure of the sweep table is a carriage movable transversely on base 542.

The base includes cross frame members 543 at intervals which support bearing members 544. The bearing members journal a long shaft 546 which extends longitudinally beneath the super-structure. Fixed to the upstream end of shaft 546 is a psrocket 548 which receives an endless chain 550. Chain 550 extends downwardly at an inclination about a drive sprocket 552 on a set shaft 554. Set shaft 554 is operatively connected to the setworks of the movable saw of the apparatus so as to rotate upon movement of the setworks in a manner to effect a corresponding movement of central shaft 546.

Other sprockets 556 are fixed at intervals to central shaft 546. A cross chain 558 is wrapped around each such sprocket 556 and is connected at its opposite ends to opposite sides of the superstructure at 559, 560. Thus movement of the setworks of the movable saw effects a corresponding transverse movement of the superstructure of the sweep table.

The superstructure of the modified sweep table is similar to that of previously described sweep table in that longitudinally aligned sweep fingers 562 are adapted to sweep right or left across the sweep table. Also the superstructure includes the usual series of driven rolls 564 and skid lifts 556.

However, the skid lifts are split transversely into two sections including a long section 566a and a shorter section 566b with the split 566c between sections occurring at a transverse point on the sweep table which remains in longitudinal alignment with the movable saw. It will also be noted that sweep fingers 562 are normally centered in longitudinal alignment with the splits 566c between skid lift sections and with the movable saw. This alignment feature enables the sweep table to carry out its edge-picking function and also to transfer different portions of cut material in different directions.

Each section of each skid lift 566 can be pivoted independently of the other section through connection of the separate sections to different power cylinders 568, 569 on opposite sides of the superstructure. Pivoting of the skid lifts is achieved in a manner similar to that shown and described with respect to the sweep table of FIG. 23. Thus one section of each skid lift 566 can be raised so that material on that side of the movable saw can be swept from one side of the sweep table while the other section of each skid lift remains lowered so that material on the opposite side of the movable saw can continue downstream off the end of the sweep table.

Sweep fingers 562 are slidably mounted on square shafts 570 and moved across the sweep table in either direction in a manner similar to that previously described with respect to the sweep table of FIG. 23. Similarly, the square shafts 570 are pivoted to pivot fingers 562 below the conveyor rolls in a manner similar to that previously described with respect to the sweep table of FIG. 23. A power cylinder 572 for pivoting the sweep fingers between their inoperative and operative positions is shown mounted on the outside of one of side frame members 536 in FIG. 26. This cylinder is connected to the cross shafts for the various sweep fingers through chain-and-sprocket connections to such shafts as shown.

Transversely disposed tandem power cylinders 574, 575 are mounted on a frame extension member 576 at the downstream end of the sweep table to provide power for sweeping fingers 562 across the table. The cylinders are arranged so that when small cylinder 575 is retracted and large cylinder 574 extended, the fingers are centered in alignment with the movable saw. Then by extending small cylinder 575 the fingers move upwardly in FIG. 26 from their centered positions. By retracting cylinder 574, the fingers are moved downwardly in FIG. 26.

The piston rod of short cylinder 575 is connected by a linkage to a cross chain 578. The linkage includes a sleeve 579 which slides on a cross shaft 580 to provide a direct application of force to chain 578. Cross chain 578 transmits power through a sprocket 582 to a long shaft 584. Power is transmitted from shaft 584 to the various sweep fingers through a series of sprockets 586 and cross chains 588.

With a modified sweep table as described, there are numerous possibilities for transferring material from such table.

First, sweep fingers 562 and skid lifts 566 can be pivoted to their lowered inoperative positions so that all material is conveyed by conveyor rolls 564 from the downstream end of the sweep table.

Second, the left-hand skid lift sections 566b of FIG. 27 can be raised while lift sections 566a remain lowered, and sweep fingers 562 move to the left in FIG. 27 to sweep material to the left of the movable saw off the left side of the swep table while material to the right of such saw moves downstream off the end of the table.

Third, the right-hand skid lift sections 566a can be raised while the left-hand sections 566b remain lowered, and sweep fingers 562 swept to the right or remove material to the right of the movable saw from the right-hand side of the sweep table while the reamining material to the left of such saw continues downstream off the end of the table.

Fourth, both skid lift sections 566a and 566b can be raised and sweep fingers 562 swept first to the left to remove part of the material on the left side of the movable saw off the left side of the sweep table. Then sweep fingers 562 can sweep across the table to the right to remove material to the right of such saw off the right side of the table.

By maintaining sweep fingers 562 in their centered positions in alignment with the movable saw through bodily movement of the entire superstructure of the sweep table, the various functions of the sweep table as just described can be carried out regardless of the position of the movable saw with respect to the fixed saw of the apparatus.

SUMMARY OF OPERATION

Summarizing a typical operation of the foregoing described apparatus, a log L flattened on at least one side by another machine in the mill travels sideways to one side of the preparation table 18 on conveyor chains 20 (FIG. 1). Then side transfer chains 78 (FIG. 9) on the preparation table rise and carry the log onto the table. Once on the table the side transfer chains retract, and the right- and left-hand flippers turn the log so that its flattened side faces downward with the log pushed against the small line bars 100, 101.

Then conveyor rolls 72 carry the log onto infeed table 22 where overhead roll 164 lowers to hold the log in general alignment with the saws and against primary line bar 42. In the meantime, the operator presses the desired lines-per-log button and line bar minus sets buttons 62 and 60 to determine the proper setting of the line bar with respect to the No. 1 saw and the proper setting of the saws with respect ot one another.

The Coleman conveyor rolls on the infeed table feed the log through the saws, which saw the log into cants and two-edge slabs (FIG. 3). Just downstream of the saws, Coleman rolls on the edte picker table aid in pulling the material through the saws while the second overhead roll 340 engages the top of the log to help in maintaining its proper alignment with the saws and separating plates. The cants cut from the log proceed downstream between separator plates 46, 48 on the picker table and the two side slabs pass downstream outside the separator plates. When the slabs strike the stops at the downstream end of the separator plates, the screw rolls work them off the opposite sides of the picker table. Eventually they are converted into chips or other end products.

At the same time the cants proceed downstream between the separator plates and onto the sweep table. When the cants are on the sweep table, the skid lifts rise and lift the cants off the conveyor rolls, after which the sweep fingers sweep across the table to push the cants onto recirculating conveyor 16 which carries the cants back to the preparation table.

On the preparation table the side transfer chains lift once again to carry one cant at a time onto the table. There the flippers turn the cant until it is in position for most economical cutting again the line bar.

The cant then moves onto the infeed table where the two side press rolls push against the cant to press it against the primary line bar. In the meantime, the primary line bar has been offset from the No. 1 saw to the extent necessary to cut the cant into boards of desired thickness through pressing of the resaw button. This button overrides the line bar buttons 60 and gangs all of the same and the line bar equal distances apart. The driven side press rolls and Coleman conveyor rolls feed the cant through the ganged saws and onto the edge picker table, where the separator plates have been retracted out of alignment with the saws so as not to interfere with the resawing function. During this operation the overhead rolls are also retracted.

The conveyor rolls of the edge picker table convey the resulting boards onto the sweep table where they can either be conveyed off the end of the table for further processing elsewhere or swept once again by the sweep fingers onto the recirculating conveyor for transfer back to the preparation table for edging. In the latter case the boards are positioned so as to lie flat on the conveyor rolls with one side edge up against the line bars. The operator presses the appropriate edge button 64 on the control panel to align the No. 1 and No. 4 saws a predetermined distance apart to cut the board to a predetermined width and to pull the other saws out of cutting alignment with the material. He also presses the appropriate line bar sets button 60 to position the line bar to remove the desired amount of edge from the board.

At the same time the separator plates on the edge picker table are aligned with the No. 1 and No. 4 saws. Thus edge trimmings resulting from the two-saw edging operation are carried off the opposite sides of the edge picker table while the trimmed boards are conveyed between the separator plates to the sweep table. During theis two-saw edging phase of the process, the sweep fingers and skid lifts are pivoted to their inoperative positions so that the conveyor rolls of the sweep table convey the finished boards downstream off the end of the sweep table.

ALTERNATIVE CONSTRUCTIONS

The foregoing describes the illustrated apparatus and one method of operating such apparatus to break down a log into lumber. However, numerous modifications of the details of the apparatus are possible, and modifications in its operation are also possible. A few of these possible modifications are mentioned below.

Control

The control panel of FIG. 6 and the manner of programming it to operate the various elements in the described manner is merely illustrative. For example, if desired a separate "return" button could be provided to recirculate material to the infeed side of the saws. Also, the "resaw" button may be programmed to override the lines per log and line bar set buttons to gang the line bar and saws so that they are spaced equal distances apart. It is to be understood that the illustrated control panel could be replaced by a completely manual push button system or any other system whereby an operator can cause the various elements of the apparatus to function in the desired manner at the proper time.

The speed of the infeed table could be controlled automatically, if desired, by a sensor that regulates conveyor speed as a function of the thickness of the piece being cut, with the speed slowing with increases in thickness.

Each setworks shown schematically in FIG. 2 may comprise a single line of tandem cylinders, or a single cylinder with a close-off valve to provide a variable stroke.

The air motor 88 shown in FIG. 9 to control the operation of the side transfer chains may be replaced by a variable speed, reversible electric motor.

Saw Section

Although the illustrated apparatus employs four saws, any multiple number of saws may be used. Also, the setworks shown are set up to move three of the saws and the line bar, with the No. 1 saw remaining fixed as a reference. Alternatively, the setworks spacing means could be set up to move all of the saws, with the line bar reminaing fixed and serving as a reference for the saws.

Preparation Table

The preparation table illustrated has side transfer chains for receiving material from either side of the table. However, such table may also receive material fed endwise onto its upstream end from another conveyor (not shown).

A fifth side transfer chain may be added to the four chains shown. Such fifth chain could be operable independently of the other chains to shift one end of the material right or left on the table as desired.

Infeed Table

The roll case type conveyor table could be replaced by a slat bed type table well known in the industry. In such case the slat bed would replace all rolls, including the Coleman rolls. Also, where a roll case infeed table is used, the Coleman rolls may be replaced by knurled rolls or any other rolls having a gripping surface providing a positive feeding action. Of course, if the slat bed should be used, it would be driven at variable speeds in either a forward or reverse direction, the same as the rolls shown.

With reference to FIGS. 15 and 17, the side press roll 188 may be of a swinging arm design similar to side press rol 186. Alternatively, each side press roll, or pressing means, may comprise a pair of upright sprocketed rolls, one driven and one idling, with a series of endless roller chains trained about them and with the unit swinging inwardly toward the line bar about the vertical axis of one sprocket roll under the influence of a power cylinder.

Edge Picker Table

Although the separating plates of the edge picker table are shown aligned with the No. 1 and No. 4 saws, they can in fact be aligned with any saw as desired by the operator. They may also be pulled out of alignment with the saws when desired, either individually or together. Knurled or other positive feed rolls may also be substituted for the Coleman rolls on the edge picker table.

Sweep Table

The sweep table of FIG. 23 is capable of sweeping material sideways in either direction if desired. Thus material may be swept to another conveyor system on an opposite side of the sweep table from the recirculating conveyor.

Also, the sweep table of FIG. 23 may be provided with "dead" or idler rolls, or even no rolls at all if the material is to be swept right or left only and not off the downstream end of the table. If dead rolls are used, the skid lifts may be eliminated.

Reeving other than the specific chain reeving arrangement shown in FIG. 25 may be used to connect the sweep fingers 484 to cylinder 520 so as to sweep the fingers across the table at a faster rate than the cylinder rod moves. Also, cable or other linkage system may be substituted for the cylinder and chain arrangement shown. The same is true with respect to the modified sweep table of FIG. 26.

The sweep table of FIG. 26 is capable of being used with more than two saws. It is also capable of sweeping a first portion of cut material left and a second portion right, whild conveying a third portion from the end of the table as well as conveying all material right, left or straight, or any combination of the above.

The sweep table of FIG. 26 may also be provided with dead rolls rather than driven rolls, or no rolls at all, if it is desired to sweep the material only right or left. In such a case, a stop may be provided at the downstream end of the table to limit downstream movement of the material, and the skid lifts could be elminated.

No doubt other modifications will occur to persons skilled in the art from the foregoing description without departing from the principles of the invention. Having illustrated and described the principles of our invention by what is presently a preferred embodiment and some suggested alternatives, it should be apparent to those skilled in the art that such embodiment and alternatives permit of modification in arrangement and detail which should be considered to be within th scope of our invention.

We claim:

1. An edger-resaw apparatus for processing logs into lumber comprising in combination:
    a saw section including multiple vertical band saws,
    means for changing the transverse spacing between said saws so that boards of different thicknesses can be produced by said saws and for repositioning said saws so that less than all of said saws can be used during a sawing cycle and so that said saws can be used for both edging and resawing material,
    an infeed section including means for orienting and feeding elongated material in a straight path longitudinally through said saw section,
    an outfeed section for receiving cut material from said saw section including means for separating edge trimmings from said cut material and means for directing said cut material selectively in at least two different directions downstream of said saw section,
    and recirculating means for receiving cut material including boards from said outfeed section directed in one of said two directions and recirculating said cut material including boards back to said infeed section for further processing through said saw section.

2. Apparatus according to claim 1 wherein there are at least two said saws positionable first in cutting positions for edging a log or board conveyed through said saw section and positionable secondly for reducing the edged log or board into multiple smaller boards.

3. Apparatus according to claim 1 including control means for controlling the positioning of said saws, said control means including means for superimposing on a log or board or image thereof a series of equally spaced-apart parallel lines with a first one of said lines being aligned with the saw line of one of said saws for estimating the number of saw cuts obtainable from a given log, cant or board.

4. Apparatus according to claim 3 wherein said lines are consecutively numbered and spaced to indicate directly the number of cuts obtainable from a log or board and wherein said control means includes a control panel with a series of depressible numbered buttons with numbers corresponding to said numbered lines, said buttons when depressed being operable to determine the optimum settings for said saws during the next cutting cycle.

5. Apparatus according to claim 1 wherein said infeed section includes infeed conveyor table means, line bar means extending longitudinally of said table means into said saw section, retractable side pressing means selectively movable against one side of said material to press said material against said line bar means in said saw section, and retractable overhead pressing means selectively engageable with a top surface portion of said material adjacent said saw section.

6. Apparatus according to claim 5 wherein said outfeed section comprises a second conveyor table means extending downstream from said saws and a second retractable overhead pressing means selectively engageable with a top surface portion of said material adjacent said saw section.

7. Apparatus according to claim 1 wherein said outfeed section includes a first outfeed section adjacent said saws for separating lumber edgings from the usable lumber portion of said material and a second outfeed section downstream from said first section for selectively conveying said usable lumber portion in either one of at least two directions.

8. Apparatus according to claim 5 wherein said infeed section includes preparation table means upstream from said conveyor table means, said preparation table means including side transfer means movable vertically between positions above and below the upper level of said preparation table means for transferring material sideways onto said preparation table means from either side of said table means and into variable transverse positions thereon, flipper means for turning said material clockwise and counterclockwise about its longitudinal axis on said preparation table mean, and straightedge means in longitudinal alignment with said line bar means, and means for transferring material lengthwise from said preparation table means onto said infeed conveyor table means.

9. Apparatus according to claim 1 wherein said outfeed section includes an outfeed conveyor table downstream from said saws, said outfeed conveyor table including separating means for separating cut portions of material severed by said saws and conveying the separate portions in different directions downstream from said saws said separating means being aligned longitudinally with at least one of said saws, and moving means for maintaining alignment of said separating means with its aligned saw upon movement of said saw, and means operable independently of said moving means for selectively moving said separating means to an inoperative position with respect to said saws.

10. Apparatus according to claim 9 wherein said separating means includes a pair of transversely spaced-apart and longitudinally extending upright separating plates, a first one of said plates being aligned with one of said saws and a second one of said plates being aligned with another one of said saws, said independently operable means being operable to move said plates in opposite directions out of alignment with said saws.

11. Apparatus according to claim 9 wherein said separating means includes a plurality of longitudinally aligned sweep fingers mounted by said outfeed conveyor table, said moving means being operable to shift said table to maintain longitudinal alignment of said fingers with one of said saws, said independently operable means being operable to pivot said fingers downwardly below the upper level of said conveyor table and including additional means for moving said fingers together in either direction across said conveyor table to sweep material from said table.

12. Apparatus according to claim 10 wherein said separating means includes a plurality of longitudinally aligned sweep fingers mounted by said outfeed conveyor table, said moving means being operable to shift said table to maintain longitudinal alignment of said fingers with one of said saws, said independently operable means being operable to pivot said fingers downwardly below the upper level of said conveyor table and including additional means for moving said fingers together in either direction across said conveyor table to sweep material from said table.

* * * * *